(12) United States Patent
Kimura et al.

(10) Patent No.: US 11,349,603 B2
(45) Date of Patent: *May 31, 2022

(54) RECEPTION DEVICE AND RECEPTION METHOD

(71) Applicant: Panasonic Intellectual Property Corporation of America, Torrance, CA (US)

(72) Inventors: Tomohiro Kimura, Osaka (JP); Yutaka Murakami, Kanagawa (JP); Mikihiro Ouchi, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/793,763

(22) Filed: Feb. 18, 2020

(65) Prior Publication Data

US 2020/0186282 A1 Jun. 11, 2020

Related U.S. Application Data

(63) Continuation of application No. 16/444,663, filed on Jun. 18, 2019, now Pat. No. 10,608,783, which is a
(Continued)

(30) Foreign Application Priority Data

Mar. 30, 2016 (JP) .................. 2016-069578
Dec. 27, 2016 (JP) .................. 2016-254546

(51) Int. Cl.
*H04L 1/00* (2006.01)
*H04J 7/02* (2006.01)
(Continued)

(52) U.S. Cl.
CPC .............. *H04L 1/0054* (2013.01); *H04J 7/02* (2013.01); *H04L 1/0003* (2013.01);
(Continued)

(58) Field of Classification Search
CPC ..... H04J 7/02; H04J 13/0003; H04L 27/3488; H04L 1/0003; H04L 27/389; H04B 1/0475; H04B 1/10
(Continued)

(56) References Cited

U.S. PATENT DOCUMENTS

| | | | |
|---|---|---|---|
| 7,876,784 B1 | 1/2011 | Lee | |
| 2006/0171283 A1* | 8/2006 | Vijayan | ............... H04L 27/3488 369/94 |

(Continued)

FOREIGN PATENT DOCUMENTS

| | | |
|---|---|---|
| EP | 2876833 | 5/2015 |
| WO | 2013/168790 | 11/2013 |
| WO | 2013/176042 | 11/2013 |

OTHER PUBLICATIONS

International Search Report (ISR) dated Jun. 13, 2017 in International (PCT) Application No. PCT/JP2017/011679.
(Continued)

*Primary Examiner* — Leila Malek
(74) *Attorney, Agent, or Firm* — Wenderoth, Lind & Ponack, L.L.P.

(57) ABSTRACT

A reception device includes: a receiver that receives a multiplexed signal; a first demapper that demaps the multiplexed signal, with a second modulated symbol stream of a second data series being included in the multiplexed signal as an undefined signal component, to generate a first bit likelihood stream of a first data series; a second demapper that demaps the multiplexed signal, with a first modulated symbol stream of the first data series being included in the multiplexed signal as an undefined signal component, to generate a second bit likelihood stream of the second data series; a first decoder that performs error control decoding on the first bit likelihood stream to derive the first data series; and a second decoder that performs error control
(Continued)

decoding on the second bit likelihood stream to derive the second data series.

2 Claims, 18 Drawing Sheets

Related U.S. Application Data continuation of application No. 16/139,815, filed on Sep. 24, 2018, now Pat. No. 10,396,938, which is a continuation of application No. PCT/JP2017/011679, filed on Mar. 23, 2017.

(51) Int. Cl.
    *H04L 27/26*     (2006.01)
    *H04L 27/36*     (2006.01)
    *H04L 25/06*     (2006.01)
    *H04L 27/38*     (2006.01)

(52) U.S. Cl.
    CPC ............ *H04L 25/067* (2013.01); *H04L 27/26* (2013.01); *H04L 27/36* (2013.01); *H04L 27/389* (2013.01)

(58) Field of Classification Search
    USPC ......................................................... 375/341
    See application file for complete search history.

(56) References Cited

U.S. PATENT DOCUMENTS

| | | |
|---|---|---|
| 2006/0227901 A1 | 10/2006 | Gao et al. |
| 2015/0124902 A1 | 5/2015 | Goto et al. |
| 2015/0171983 A1 | 6/2015 | Kusashima |
| 2016/0352462 A1* | 12/2016 | Oh ........................ H04L 1/0057 |
| 2017/0111198 A1 | 4/2017 | Park et al. |

OTHER PUBLICATIONS

Seokhyun Yoon, et al., "Performance of Superposition Coded Broadcast/Unicast Service Overlay System", IEICE Transactions on Communications, vol. E91-B, No. 9, pp. 2933-2939, Sep. 2008.
Thomas M. Cover, "Broadcast Channels", IEEE Transactions on Information Theory, vol. IT-18, No. 1, pp. 2-14, Jan. 1972.
J. Zoellner, et al., "Optimization of High-order Non-uniform QAM Constellations", IEEE International Symposium on Broadband Multimedia Systems and Broadcasting, Jun. 2013.
Lee Jae-Young et al.: "Performance evaluation of lower layer system in cloud transmission for terrestrial DTV broadcasting", 2014 IEEE International Symposium on Broadband Multimedia Systems and Broadcasting, IEEE, Jun. 25, 2014, pp. 1-3.
Extended European Search Report dated Mar. 14, 2019 in corresponding European Patent Application No. 17774651.8.
Office Action dated Jun. 18, 2021 in corresponding European Patent Application No. 17774651.8.

* cited by examiner

RECEPTION DEVICE AND RECEPTION METHOD

CROSS REFERENCE TO RELATED APPLICATIONS

This application is a continuation of U.S. application Ser. No. 16/444,663, filed Jun. 18, 2019, which is a continuation of U.S. application Ser. No. 16/139,815, filed Sep. 24, 2018, now U.S. Pat. No. 10,396,938, which is a U.S. continuation application of PCT International Patent Application Number PCT/JP2017/011679 filed on Mar. 23, 2017, claiming the benefit of priority of Japanese Patent Application Number 2016-069578 filed on Mar. 30, 2016, and Japanese Patent Application Number 2016-254546 filed on Dec. 27, 2016, the entire contents of which are hereby incorporated by reference.

BACKGROUND

1. Technical Field

The present disclosure relates to a reception device, etc. that receive a multiplexed signal and derive a plurality of data series from the multiplexed signal.

2. Description of the Related Art

A multiplexing scheme utilizing superposition coding is known as a scheme to multiplex and send a plurality of data series (see Seokhyun YOON and Donghee KIM, Performance of Superposition Coded Broadcast/Unicast Service Overlay System, IEICE Transactions on Communications, vol. E91-B, No. 9). Other known multiplexing schemes include time division multiplexing and frequency division multiplexing (see Thomas M. Cover, Broadcast Channels, IEEE Transactions on Information Theory, vol. IT-18, No. 1).

Compared to time division multiplexing and frequency division multiplexing, the multiplexing scheme utilizing superposition coding is suited to multiplexing a plurality of data series that are required to have different levels of noise tolerance (receiver tolerance). The multiplexing scheme utilizing superposition coding is also termed as layer division multiplexing. The multiplexing scheme utilizing superposition coding applied to multiple access is also known as non-orthogonal division multiple access (NOMA).

In the multiplexing scheme utilizing superposition coding, a transmission device superposes a plurality of modulated symbols, which are obtained by modulating each of a plurality of data series, using predetermined power allocation, and transmits the superposed modulated symbols. A reception device sequentially demodulates the modulated symbols that are multiplexed by superposition coding, starting with modulated symbols in a layer with high noise tolerance until the completion of demodulating modulated symbols in a layer to which a desired data series belongs.

More specifically, the reception device demodulates the modulated symbols in a layer with the highest noise tolerance to estimate a data series. When a desired data series is yet to be estimated, the reception device generates a replica of each modulated symbol from another data series that has been estimated to cancel the replica from the received signal, and demodulates modulated symbols in a layer with the second highest noise tolerance to estimate another data series. The reception device repeats these processes until the desired data series is estimated.

SUMMARY

In some cases, the multiplexing scheme utilizing superposition coding fails to efficiently process a plurality of data series.

For example, the multiplexing scheme utilizing superposition coding is subjected to processing delays due to the process that requires sequential decoding of a plurality of multiplexed data series. Furthermore, the multiplexing scheme utilizing superposition coding requires the reception device to include an arithmetic resource, etc. for re-modulating a forward decoded data series. The reception device is also required to include a memory resource, etc. for holding received symbols used to decode the subsequent data series, from when the previous data series is decoded and re-modulated until when a modulated symbol stream of the previous data series is obtained.

Moreover, the multiplexing scheme utilizing superposition coding may suffer a decrease in transmission capacity due to a plurality of superposed data series affecting each another.

The present disclosure provides exemplary embodiments that solve the above-described problems involved in the multiplexing scheme utilizing superposition coding. The present disclosure, however, also provides an aspect that solves not completely but partially the above-described problems, or an aspect that solves a problem different from the above-described problems.

The reception device according to one aspect of the present disclosure is a reception device that receives a multiplexed signal into which a plurality of data series have been multiplexed by superposition coding, and derives the plurality of data series from the multiplexed signal, the plurality of data series including a first data series in a first layer and a second data series in a second layer. Such reception device includes: a receiver that receives the multiplexed signal; a first demapper that demaps the multiplexed signal, with a second modulated symbol stream of the second data series being included in the multiplexed signal as an undefined signal component, to generate a first bit likelihood stream of the first data series; a second demapper that demaps the multiplexed signal, with a first modulated symbol stream of the first data series being included in the multiplexed signal as an undefined signal component, to generate a second bit likelihood stream of the second data series; a first decoder that performs error control decoding on the first bit likelihood stream to derive the first data series; and a second decoder that performs error control decoding on the second bit likelihood stream to derive the second data series.

Note that these general or specific aspects may be implemented as a system, a device, a method, an integrated circuit, a computer program, or a non-transitory, computer-readable recording medium such as a CD-ROM, or may be implemented as any combination of a system, a device a method, an integrated circuit, a computer program, and a recording medium.

The reception device, etc. according to one aspect of the present disclosure are capable of efficiently performing processes in a multiplexing scheme utilizing superposition coding.

Further merits and advantageous effects in one aspect of the present disclosure will become apparent from the following description and drawings. These merits and advantageous effects are provided by the characteristics described in the following description and drawings. However, not all of these merits and advantageous effects are required to be provided, and thus one or more of these merits and advantageous effects may be provided by one or more of the characteristics described in the description and drawings.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

The following describes in detail the embodiments according to the present disclosure with reference to the drawings. Note that the following embodiments, etc. show a comprehensive or specific illustration of the present disclosure. The numerical values, shapes, materials, structural components, the arrangement and connection of the structural components, steps, the processing order of the steps, etc. shown in the following embodiments, etc. are mere examples, and thus are not intended to limit the present disclosure. Of the structural components described in the following embodiments, etc. structural components not recited in any one of the independent claims that indicate the broadest concepts of the present disclosure will be described as optional structural components.

Also note that encoding may mean error control coding. Error control coding is also referred to as error-correcting coding. Also, decoding may mean error control decoding. Error control decoding is also referred to as error-correcting decoding or error correction. Also, unknown may mean undefined, and transmission may mean sending.

Embodiment 1

The present embodiment describes multiplexing a plurality of data series onto a plurality of layers by a multiplexing scheme utilizing superposition coding, and transmitting the multiplexed data series.

To simplify the description without loss of generality, the present embodiment and other embodiments describe an example in which two data series are multiplexed onto two different layers to be transmitted. However, the multiplexing scheme described in the present embodiment and other embodiments is applicable to three or more data series multiplexed onto three or more different layers to be transmitted.

Also, the present embodiment and other embodiments use a first layer to which a first data series belongs as a layer with higher noise tolerance than a second layer to which a second data series belongs.

Figure 1:
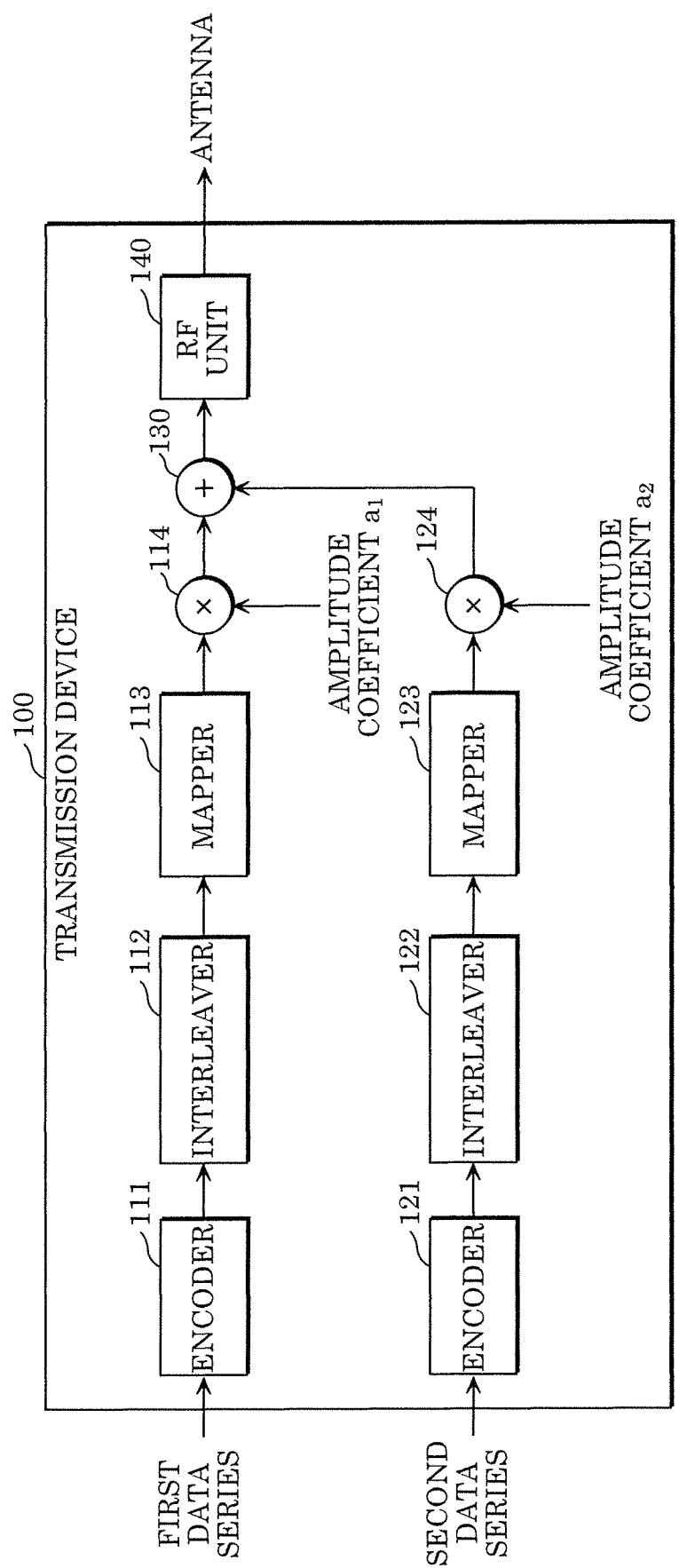
FIG. 1 is a block diagram of an example configuration of a transmission device according to Embodiment 1.

FIG. 1 shows an example configuration of transmission device 100 that multiplexes two data series onto two layers by superposition coding, and transmits the multiplexed data series. The configuration and operation of transmission device 100 will be described with reference to FIG. 1.

Transmission device 100 includes encoder 111, interleaver 112, mapper 113, multiplier 114, encoder 121, interleaver 122, mapper 123, multiplier 124, adder 130, and radio frequency unit (RF unit) 140. These structural components may also be implemented as dedicated or general-purpose circuits. Multiplier 114, multiplier 124, and adder 130 can also be represented collectively as a superposition unit. RF unit 140 can also be represented as a transmitter. RF unit 140 may include an antenna.

Encoder 111 encodes an inputted first data series on the basis of a first error control coding scheme to generate a first bit stream. Interleaver 112 permutes the bits in the first bit stream generated by encoder 111 on the basis of a first permutation rule. Such permutation is also referred to as interleaving.

Mapper 113 maps the first bit stream permuted by interleaver 112 in accordance with a first mapping scheme (a first modulation scheme) to generate a first modulated symbol stream that includes a plurality of first modulated symbols. In the mapping in accordance with the first mapping scheme, mapper 113 maps each group of bits that includes a first number of bits in the first bit stream onto one of the signal points in a first constellation, in accordance with the values of such group of bits.

Encoder 121 encodes an inputted second data series on the basis of a second error control coding scheme to generate a second bit stream. Interleaver 122 permutes the bits in the second bit stream generated by encoder 121 on the basis of a second permutation rule. Such permutation is also referred to as interleaving.

Mapper 123 maps the second bit stream permuted by interleaver 122 in accordance with a second mapping scheme (a second modulation scheme) to generate a second modulated symbol stream that includes a plurality of second modulated symbols. In the mapping in accordance with the second mapping scheme, mapper 123 maps each group of bits that includes a second number of bits in the second bit stream onto one of the signal points in a second constellation, in accordance with the values of such group of bits.

When a mapping scheme used is PSK modulation such as BPSK and QPSK, or QAM modulation such as 16QAM and 64QAM, each modulated symbol can be represented by a complex number, for example, with the real part representing the magnitude of the in-phase component and the imaginary part representing the magnitude of the orthogonal component. Meanwhile, when a mapping scheme used is PAM modulation, each modulated symbol can be represented by a real number.

Multiplier 114 multiplies each first modulated symbol in the first modulated symbol stream by first amplitude coefficient $a_1$. Multiplier 124 multiplies each second modulated symbol in the second modulated symbol stream by second amplitude coefficient $a_2$. Adder 130 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 140 sends the generated superposed modulated symbol stream as a signal. More specifically, RF unit 140 generates, from the superposed modulated symbol stream generated by adder 130, a radio-frequency signal as a signal corresponding to the superposed modulated symbol stream to send such radio-frequency signal from the antenna.

Stated differently, the superposition unit constituted by multiplier 114, multiplier 124, and adder 130 superposes the first modulated symbol stream and the second modulated symbol stream at a predetermined amplitude ratio, thereby generating a multiplexed signal into which the first data series and the second data series are multiplexed. Subsequently, RF unit 140 sends the multiplexed signal. Note that the multiplexed signal corresponds to the superposed modulated symbol stream. Also note that the predetermined amplitude ratio may be 1:1, and that the multiplication may be omitted.

Figure 2:
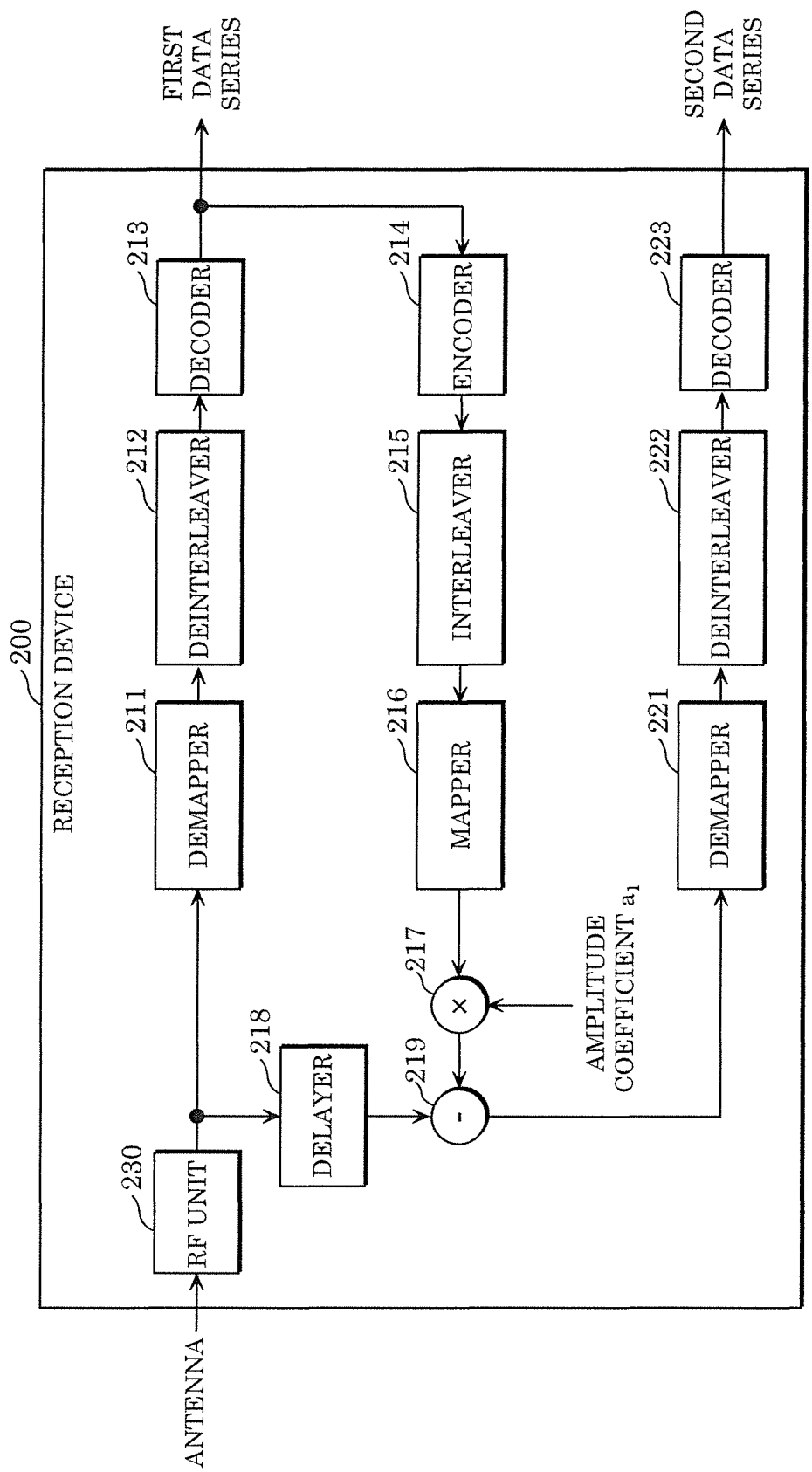
FIG. 2 is a block diagram of an example configuration of a reception device according to Embodiment 1.

FIG. 2 shows an example configuration of reception device 200 capable of receiving and sequentially decoding the signal on which two data series are multiplexed onto two layers by superposition coding, and capable of obtaining (extracting) one of or both of the multiplexed two data series. The configuration and operation of reception device 200 will be described with reference to FIG. 2.

Reception device 200 includes RF unit 230, demapper 211, deinterleaver 212, decoder 213, encoder 214, interleaver 215, mapper 216, multiplier 217, delayer 218, subtractor 219, demapper 221, deinterleaver 222, and decoder 223. These structural components may also be implemented as dedicated or general-purpose circuits.

Demapper 211, deinterleaver 212, decoder 213, encoder 214, interleaver 215, mapper 216, multiplier 217, delayer 218, subtractor 219, demapper 221, deinterleaver 222, and decoder 223 can also be represented collectively as a derivation unit. RF unit 230 can also be represented as a receiver. RF unit 230 may include an antenna.

Reception device 200 receives by an antenna the multiplexed signal sent from transmission device 100, and inputs such multiplexed signal into RF unit 230. Stated differently, RF unit 230 receives the multiplexed signal via the antenna. The multiplexed signal received by RF unit 230 is also represented as a received signal, and corresponds to the superimposed modulated symbol stream into which the first modulated symbol stream and the second modulated symbol stream are multiplexed. RF unit 230 generates a baseband received signal from the radio-frequency received signal.

Demapper 211 demaps the baseband received signal on the basis of the first constellation of the first mapping scheme to generate a first bit likelihood stream. For example, amplitude coefficient $a_1$ is reflected in the first constellation for demapping.

Deinterleaver 212 permutes the first bit likelihood stream on the basis of a permutation rule that is a reverse rule of the first permutation rule. Such permutation is also referred to as deinterleaving. Decoder 213 performs decoding that is based on the first error control coding scheme by use of the first bit likelihood stream permuted by deinterleaver 212, and outputs the decoding result as the first data series.

Here, of the received signal corresponding to the superposed modulated symbol stream, demapper 211 treats the components corresponding to the second modulated symbols in the second data series as an unknown signal (noise), and performs demapping on the basis of the first constellation of the first mapping scheme.

When only the first data series is to be obtained, reception device 200 terminates the process upon completing the estimation of the first data series. Meanwhile, when the second data series is to be obtained in addition to the first data series, or when only the second data series is to be obtained, reception device 200 performs the processes described below to obtain the second data series.

Encoder 214 encodes the first data series obtained by decoder 213 on the basis of the first error control coding scheme to generate the first bit stream. Interleaver 215 permutes the bits in the first bit stream generated by encoder 214 on the basis of the first permutation rule. Such permutation is also referred to as interleaving.

Mapper 216 maps the first bit stream permuted by interleaver 215 in accordance with the first mapping scheme to generate the first modulated symbol stream that includes a plurality of first modulated symbols. Multiplier 217 multiplies the first modulated symbol stream outputted by mapper 216 by first amplitude coefficient $a_1$.

Delayer 218 delays the received signal outputted from RF unit 230 during the time from when RF unit 230 outputs the baseband received signal to when multiplier 217 outputs the reproduced first modulated symbol stream.

Subtractor 219 subtracts, from the received signal delayed by delayer 218, the first modulated symbol stream multiplied by first amplitude coefficient $a_1$ by multiplier 217. Through this, subtractor 219 removes the components corresponding to the first modulated symbols from the received signal on which the components corresponding to the first modulated symbols and the components and noise corresponding to the second modulated symbols are superposed. Subsequently, subtractor 219 outputs a signal on which the components and noise corresponding to the second modulated symbols are superposed as a signal corresponding to the second modulated symbol stream.

Demapper 221 demaps the signal outputted from subtractor 219 on the basis of the second constellation of the second mapping scheme to generate a second bit likelihood stream. For example, amplitude coefficient $a_2$ is reflected in the second constellation for demapping.

Deinterleaver 222 permutes the second bit likelihood stream on the basis of a permutation rule that is a reverse rule of the second permutation rule. Such permutation is also referred to as deinterleaving. Decoder 223 decodes the second bit likelihood stream permuted by deinterleaver 222 on the basis of the second error control coding scheme, and outputs the decoding result as the second data series.

Through the above processes, reception device 200 obtains one of or both of the first data series and the second data series from the signal received by the antenna.

<Superposition Coding>

The following describes superposition coding.

Using signal power $P_s(W)$, noise power $P_n(W)$, and transmission bandwidth $B(Hz)$, transmission capacity $C_T$ (bit/s) is given as the Shannon limit by Equation 1.

[Math. 1]

$$C_T = B \cdot \log_2\left(1 + \frac{P_s}{P_n}\right) \quad \text{(Equation 1)}$$

Transmission capacity C(bit/s/Hz) per Hz normalized by the transmission bandwidth is given by Equation 2.

[Math. 2]

$$C = \log_2\left(1 + \frac{P_s}{P_n}\right) \quad \text{(Equation 2)}$$

In the following, "transmission capacity per Hz" will be simply referred to as "transmission capacity."

In superposition coding of the first data series and the second data series, signal power $P_{s1}(W)$ of the first layer corresponding to the first data series, signal power $P_{s2}(W)$ of the second layer corresponding to the second data series, and the entire signal power $P_s(W)$ satisfy: $P_s = P_{s1} + P_{s2}$.

When demodulating the first layer, reception device 200 regards the components of the modulated symbols in the second layer as unknown components superposed on the modulated symbols in the first layer, i.e., noise. As such, transmission capacity $C_1$ of the first layer is given by Equation 3.

[Math. 3]

$$C_1 = \log_2\left(1 + \frac{P_{s1}}{P_{s2} + P_n}\right) \quad \text{(Equation 3)}$$

When reception device 200 demodulates the second layer, the components of the modulated symbols in the first layer have already been removed from the received signal. As such, transmission capacity $C_2$ of the second layer is given by Equation 4.

[Math. 4]

$$C_2 = \log_2\left(1 + \frac{P_{s2}}{P_n}\right) \quad \text{(Equation 4)}$$

As shown by Equation 5, the total of transmission capacity $C_1$ of the first layer and transmission capacity $C_2$ of the second layer agrees with the Shannon limit.

[Math. 5]

$$C_1 + C_2 = \log_2\left(1 + \frac{P_{s1}}{P_{s2} + P_n}\right) + \log_2\left(1 + \frac{P_{s2}}{P_n}\right) = \quad \text{(Equation 5)}$$

$$\log_2\left(\frac{P_s + P_n}{P_{s2} + P_n}\right) + \log_2\left(\frac{P_{s2} + P_n}{P_n}\right) =$$

$$\log_2\left(\frac{P_s + P_n}{P_n}\right) = \log_2\left(1 + \frac{P_s}{P_n}\right)$$

In the present embodiment, signal power $P_{s1}$ of the first layer corresponding to the first data series is proportional to the second power of first amplitude coefficient $a_1$, and signal power $P_{s2}$ of the second layer corresponding to the second data series is proportional to the second power of second amplitude coefficient $a_2$. The allocation of signal power to a plurality of layers is determined by an amplitude coefficient that is multiplied to the modulated symbols of each layer.

Figure 3:
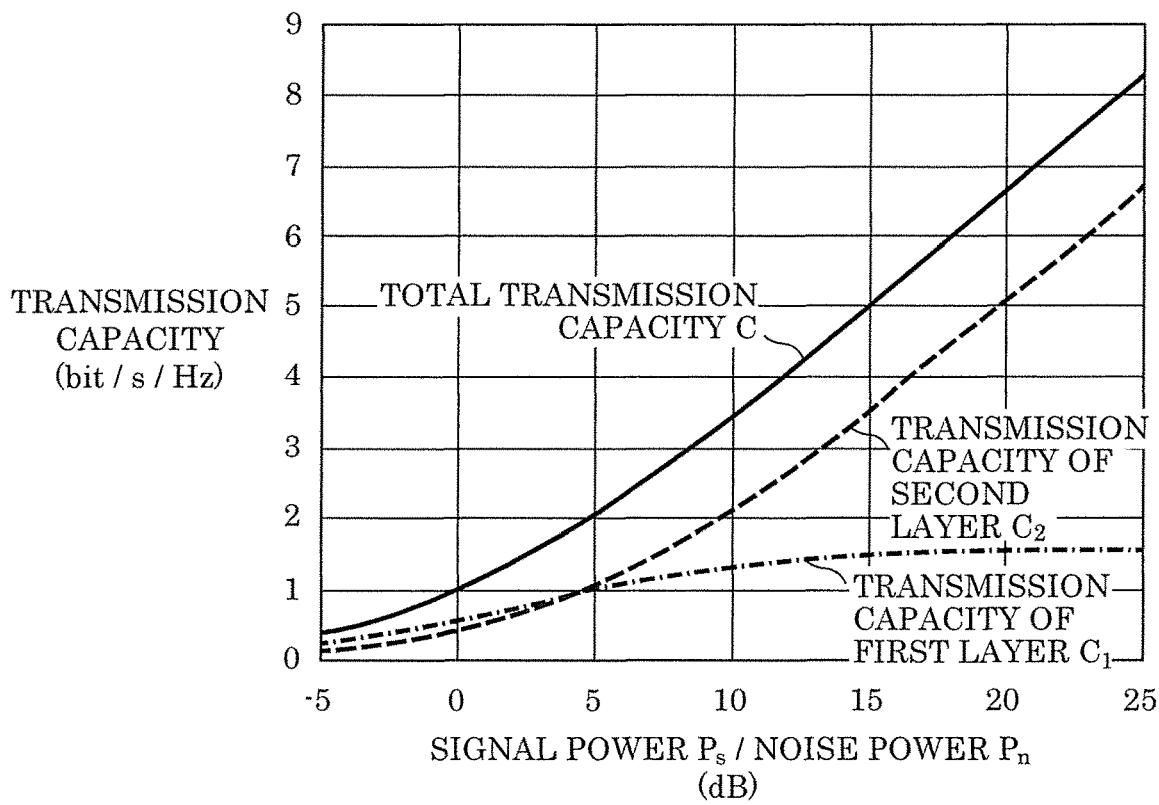
FIG. 3 is a diagram showing transmission capacities in superposition coding.

FIG. 3 shows an example simulation result of each transmission capacity when the ratio between signal power $P_{s1}$ of the first layer and signal power $P_{s2}$ of the second layer is $P_{s1}:P_{s2}=2:1$. In FIG. 3, the lateral axis represents as dB(decibel) the ratio of signal power $P_s$ to noise power $P_n$ (SNR), and the vertical axis represents transmission capacity. In FIG. 3, the dot-and-dash line indicates transmission capacity $C_1$ of the first layer, the broken line indicates transmission capacity $C_2$ of the second layer, and the solid line indicates the total transmission capacity of transmission capacity $C_1$ of the first layer and transmission capacity $C_2$ of the second layer.

Note that SNR, which means a ratio of signal power to noise power, is also referred to as a signal-to-noise power ratio or a signal-to-noise ratio.

<Non-Uniform Constellation>

Transmission device 100 according to the present embodiment can employ any mapping scheme for each of the first mapping scheme and the second mapping scheme. Reception device 200 demodulates the first layer, with the second modulated symbols of the second layer remaining unknown. As such, a mapping scheme such as QPSK, for example, that mainly supports a low SNR is suitable as the first mapping scheme.

Figure 4:
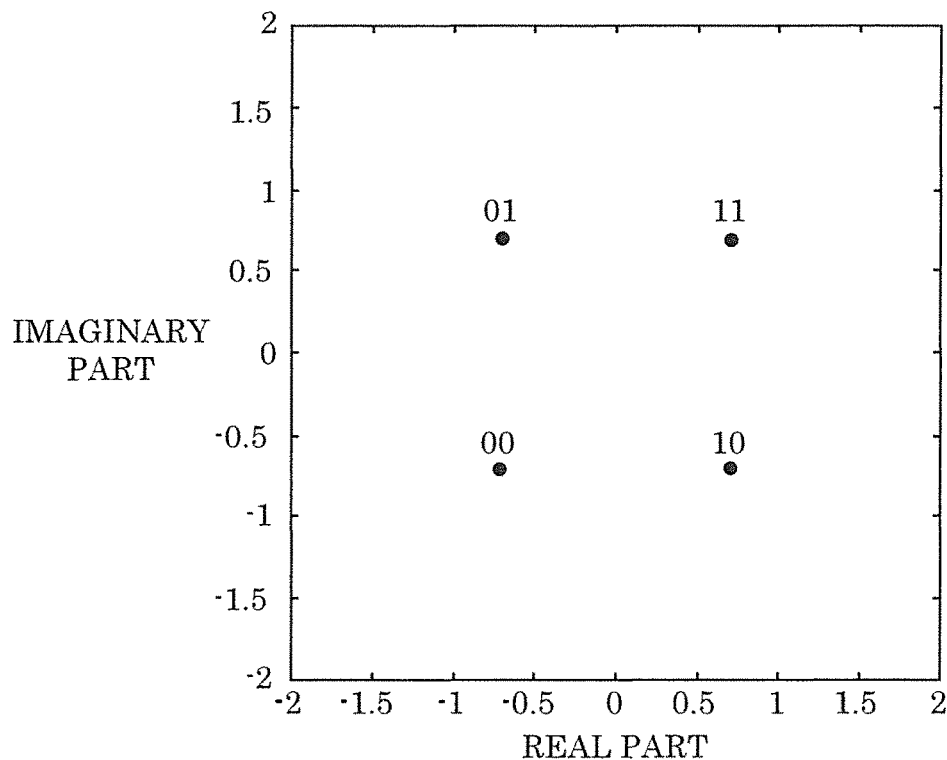
FIG. 4 is a diagram showing an example QPSK constellation.

FIG. 4 shows an example QPSK constellation. More specifically, four QPSK signal points are plotted in the complex plane, with the lateral axis representing the real part (the real component) and the vertical axis representing the imaginary part (the imaginary component). In QPSK, a group of bits (00, 01, 10, or 11) is associated with a modulated symbol indicating a complex number on the basis of the constellation shown in FIG. 4.

Meanwhile, the second layer is demodulated with the modulated symbols in the first layer having been removed. As such, the second mapping scheme may be a mapping scheme that utilizes multilevel constellation supporting a high SNR.

Non-uniform constellations as disclosed in "J. Zoellner and N. Loghin, Optimization of High-order Non-uniform QAM Constellations, IEEE International Symposium on Broadband Multimedia Systems and Broadcasting 2013" have received recent attention as multilevel constellations. Unlike conventional uniform constellations that include uniformly spaced signal points, such as a QAM constellation, a non-uniform constellation includes ununiformly spaced signal points. In some cases, a mapping scheme using a non-uniform constellation improves the transmission capacity compared to a mapping scheme using a uniform constellation.

Figure 5:
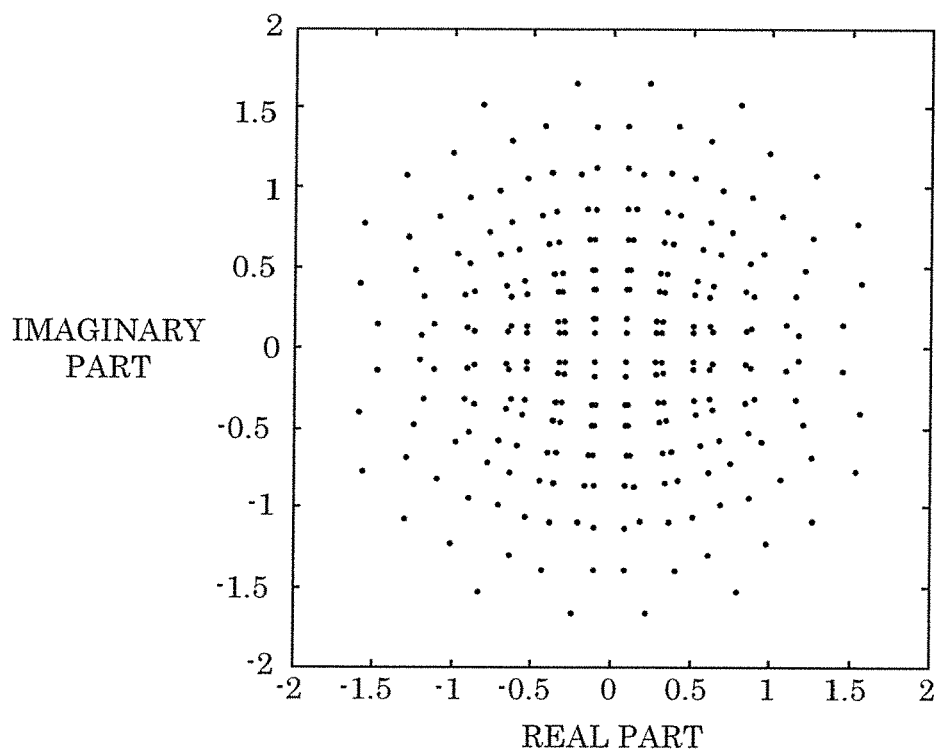
FIG. 5 is a diagram showing an example non-uniform constellation.

FIG. 5 shows an example non-uniform constellation including 256 signal points (Nu-256QAM). In FIG. 5, 256 non-uniform constellation signal points are plotted in the complex plane, with the lateral axis representing the real part and the vertical axis representing the imaginary part.

The following describes an example of using QPSK shown in FIG. 4 as the first mapping scheme and Nu-256QAM shown in FIG. 5 as the second mapping scheme in the multiplexing scheme that utilizes superposition coding.

Figure 6:
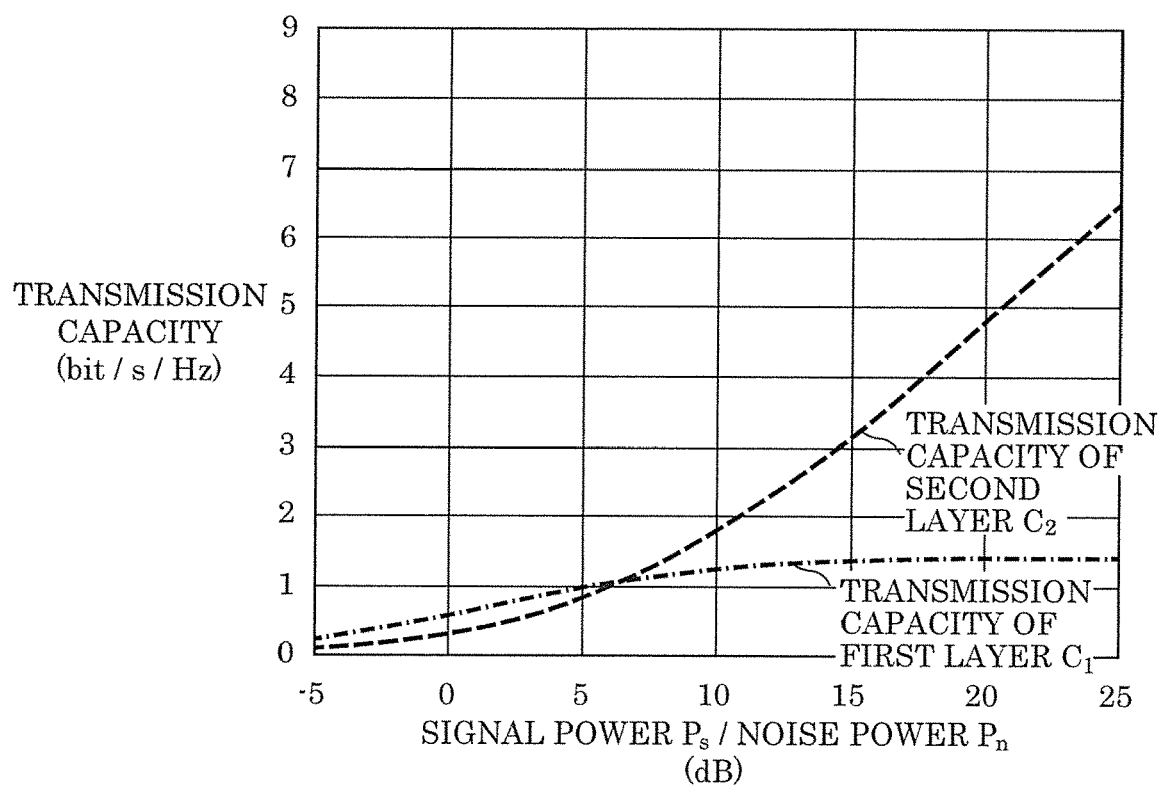
FIG. 6 is a diagram showing transmission capacities in superposition coding using QPSK and Nu-256QAM.

FIG. 6 shows an example simulation result of each transmission capacity when the ratio between signal power $P_{s1}$ of the first layer and signal power $P_{s2}$ of the second layer is $P_{s1}:P_{s2}=2:1$. In FIG. 6, the lateral axis represents as dB(decibel) the ratio of signal power $P_s$ to noise power $P_n$ (SNR), and the vertical axis represents transmission capacity. In FIG. 6, the dot-and-dash line indicates transmission capacity $C_1$ of the first layer, and the broken line indicates transmission capacity $C_2$ of the second layer. A combination of QPSK and Nu-256QAM achieves a transmission capacity that is close to the limit shown in FIG. 3.

As described above, transmission device 100 according to the present embodiment is capable of highly efficient multiplexing and transmission of a plurality of data series by a multiplexing scheme utilizing superposition coding. Reception device 200 is capable of receiving a plurality of data series that have been multiplexed in a highly efficient manner by the multiplexing scheme utilizing superposition coding. Transmission device 100 and reception device 200 are also capable of increasing the transmission capacity by use of a non-uniform constellation.

Note that permutation (interleaving and deinterleaving) reduces the effects that may be caused when successive errors occur. Permutation (interleaving and deinterleaving) also controls the correspondence among bits included in codewords in error correcting coding, modulated symbols, and bits included in such modulated symbols. However, such permutation (interleaving and deinterleaving) may be omitted.

Stated differently, interleaver 112 and interleaver 122 are optional structural components, and thus may not be included in transmission device 100. Similarly, deinterleaver 212, interleaver 215, and deinterleaver 222 are optional structural components, and thus may not be included in reception device 200.

Interleaving and deinterleaving, however, make a pair. As such, when transmission device 100 includes interleaver 112 and interleaver 122, reception device 200 basically includes deinterleaver 212, interleaver 215, and deinterleaver 222. Meanwhile, when transmission device 100 does not include interleaver 112 and interleaver 122, reception device 200 does not include deinterleaver 212, interleaver 215, and deinterleaver 222.

Also, amplitude coefficient $a_1$ may be reflected in the mapping performed by mapper 216 of reception device 200. In such a case, reception device 200 may omit the multiplication, and thus may not include multiplier 217.

Error control coding on the first data series and the second data series may be performed by an external device that is different from transmission device 100. In such a case, transmission device 100 may omit the error control coding, and may not include encoder 111 and encoder 121.

Embodiment 2

<Parallel Decoding of Signal Obtained by Superposition Coding>

The present embodiment describes a reception method for parallel decoding of a signal obtained by superposition coding. The configuration of the transmission device is the same as the configuration of transmission device 100 shown in FIG. 1, and thus will not be described. In parallel decoding in superposition coding, the reception device treats the components of the modulated symbol stream in the first layer as an unknown signal (noise) to decode the second layer, without removing the components of the modulated symbol stream in the first layer included in the received signal.

Figure 7:
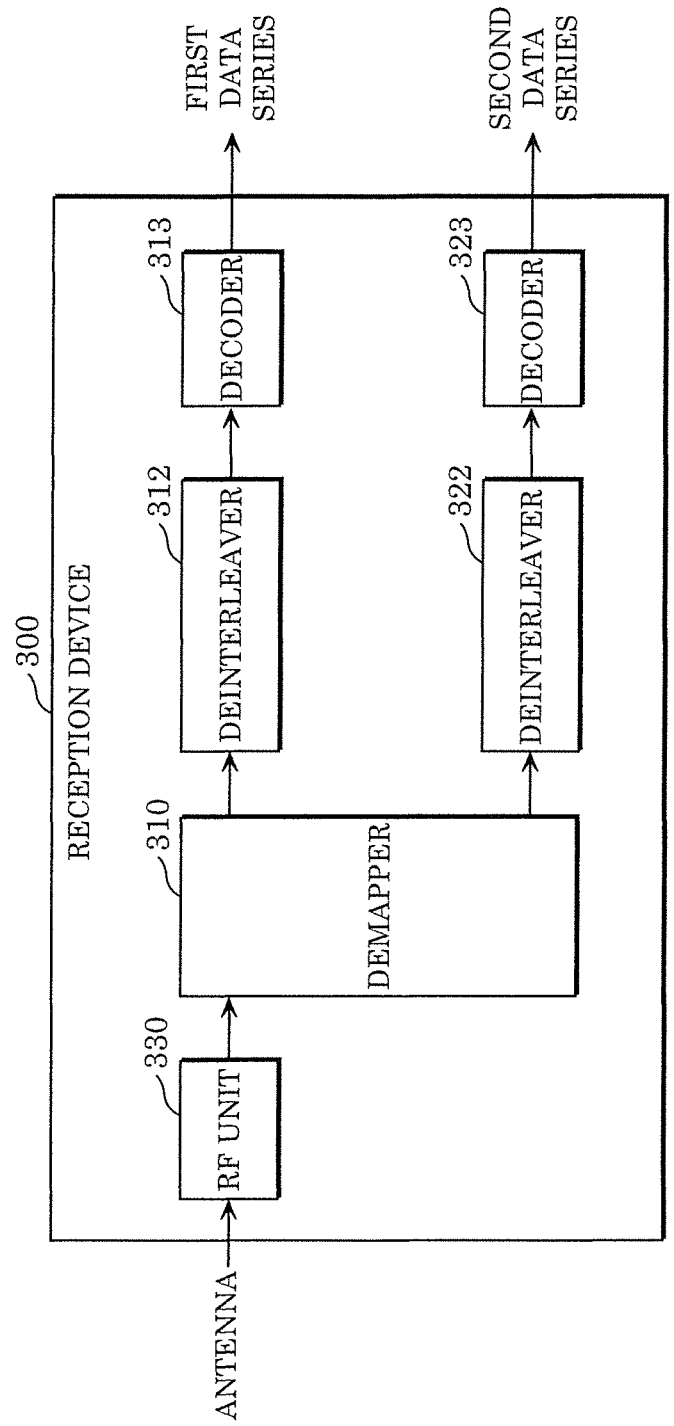
FIG. 7 is a block diagram of a first example configuration of a reception device according to Embodiment 2.

FIG. 7 shows an example configuration of reception device 300 capable of receiving and performing parallel decoding on the signal on which two data series are multiplexed onto two layers by superposition coding, and capable of obtaining one of or both of the multiplexed two data series. The configuration and operation of reception device 300 will be described with reference to FIG. 7.

Reception device 300 includes RF unit 330, demapper 310, deinterleaver 312, decoder 313, deinterleaver 322, and decoder 323. These structural components may also be implemented as dedicated or general-purpose circuits. Demapper 310, deinterleaver 312, decoder 313, deinterleaver 322, and decoder 323 can also be represented collectively as a derivation unit. RF unit 330 can also be represented as a receiver. RF unit 330 may include an antenna.

Reception device 300 receives by an antenna the multiplexed signal sent from transmission device 100, and inputs such multiplexed signal into RF unit 330. Stated differently, RF unit 330 receives the multiplexed signal via the antenna. The multiplexed signal received by RF unit 330 is also represented as a received signal. RF unit 330 generates a baseband received signal from the radio-frequency received signal.

Demapper 310 demaps the baseband received signal to generate the first bit likelihood stream and the second bit likelihood stream. For example, demapper 310 performs such demapping on the basis of a superposition constellation that shows the arrangement of the signal points of superposed modulated symbols obtained by superposing the first modulated symbols and the second modulated symbols by superposition coding.

The superposition constellation is determined in accordance with the first constellation of the first mapping scheme, the second constellation of the second mapping scheme, first amplitude coefficient $a_1$, second amplitude coefficient $a_2$, etc.

Figure 8:
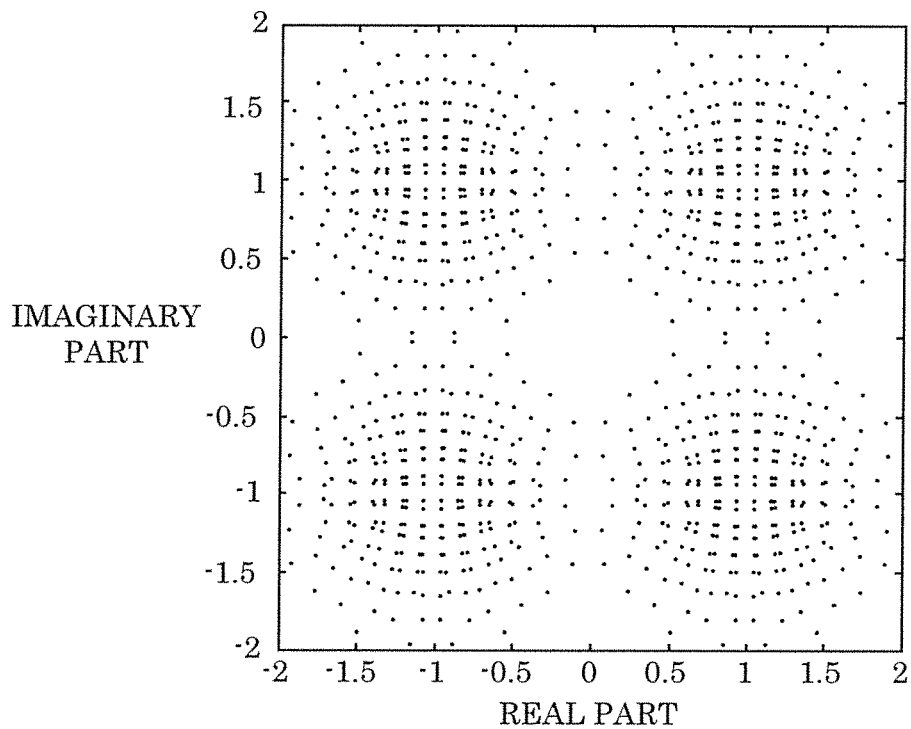
FIG. 8 is a diagram showing an example superposition constellation.

FIG. 8 shows an example superposition constellation, which is more specifically a combination of the QPSK constellation shown in FIG. 4 and the Nu-256QAM constellation shown in FIG. 5. Even more specifically, the Nu-256QAM constellation (256 signal points) is placed on each of the four regions in the complex plane in accordance with the four signal points of the QPSK constellation. These four regions, each corresponding to Nu-256QAM constellation, may partially overlap with each other.

Demapper 310 performs demapping on the basis of the superposition constellation as shown in FIG. 8. Stated differently, demapper 310 generates the first bit likelihood stream, with the modulated symbol stream of the second layer remaining unknown, and generates the second bit likelihood stream, with the modulated symbol stream of the first layer remaining unknown.

Note that demapper 310 may use the first constellation of the first mapping scheme to generate the first bit likelihood stream, and may use the above-described superposition constellation to generate the second bit likelihood stream.

The first constellation, when used to generate the first bit likelihood stream, enables demapper 310 to reduce the number of signal points that should be considered in generating the first bit likelihood stream, compared to when the superposition constellation is also used to generate the first bit likelihood stream. This thus enables demapper 310 to reduce the number of arithmetic computations.

Demapper 310 corresponds, for example, to the first demapper that demaps the received signal to generate the first bit likelihood stream and the second demapper that demaps the received signal to generate the second bit likelihood stream. Demapper 310 may include the first demapper that demaps the received signal to generate the first bit likelihood stream and the second demapper that demaps the received signal to generate the second bit likelihood stream.

Deinterleaver 312 permutes the first bit likelihood stream on the basis of a permutation rule that is a reverse rule of the first permutation rule. Such permutation is also referred to as deinterleaving. Decoder 313 decodes the first bit likelihood stream permuted by deinterleaver 312 on the basis of the first error control coding scheme, and outputs the decoding result as the first data series.

Deinterleaver 322 permutes the second bit likelihood stream on the basis of a permutation rule that is a reverse rule of the second permutation rule. Such permutation is also referred to as deinterleaving. Decoder 323 decodes the second bit likelihood stream permuted by deinterleaver 322 on the basis of the second error control coding scheme, and outputs the decoding result as the second data series.

Note that permutation (deinterleaving) may be omitted as in the case of Embodiment 1. Stated differently, deinterleaver 312 and deinterleaver 322 are optional structural components, and thus may not be included in reception device 300.

Interleaving and deinterleaving, however, make a pair. As such, when transmission device 100 includes interleaver 112 and interleaver 122, reception device 300 basically includes deinterleaver 312 and deinterleaver 322. Meanwhile, when transmission device 100 does not include interleaver 112 and interleaver 122, reception device 300 does not include deinterleaver 312 and deinterleaver 322.

Figure 9:
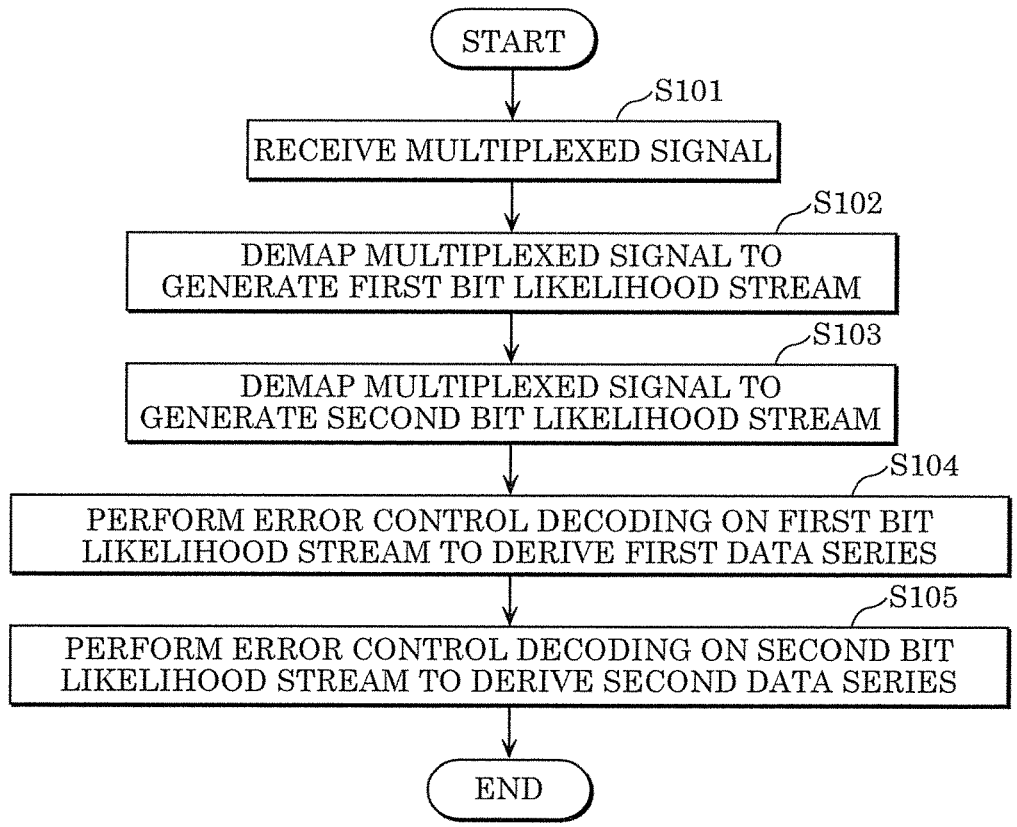
FIG. 9 is a flowchart of a first example of reception operations according to Embodiment 2.

FIG. 9 is a flowchart of example operations performed by reception device 300. First, RF unit 330 receives the multiplexed signal into which the first data series and the second data series are multiplexed (S101).

Next, demapper 310 demaps the multiplexed signal to generate the first bit likelihood stream of the first data series (S102). Demapper 310 demaps the multiplexed signal to generate the second bit likelihood stream of the second data series (S103). Deinterleaver 312 may deinterleave such generated first bit likelihood stream. Also, deinterleaver 322 may deinterleave such generated second bit likelihood stream.

Then, decoder 313 performs error control decoding on the first bit likelihood stream to derive the first data series (S104). Also, decoder 323 performs error control decoding on the second bit likelihood stream to derive the second data series (S105).

Note that processes on the first bit likelihood stream (generation, deinterleaving, and error control decoding) and processes on the second bit likelihood stream (generation, deinterleaving, and error control decoding) are basically performed in parallel.

Reception device 300 as shown in FIG. 7 that performs parallel decoding has lower performance in decoding the second layer than that of reception device 200 as shown in FIG. 2 that performs sequential decoding.

Figure 10:
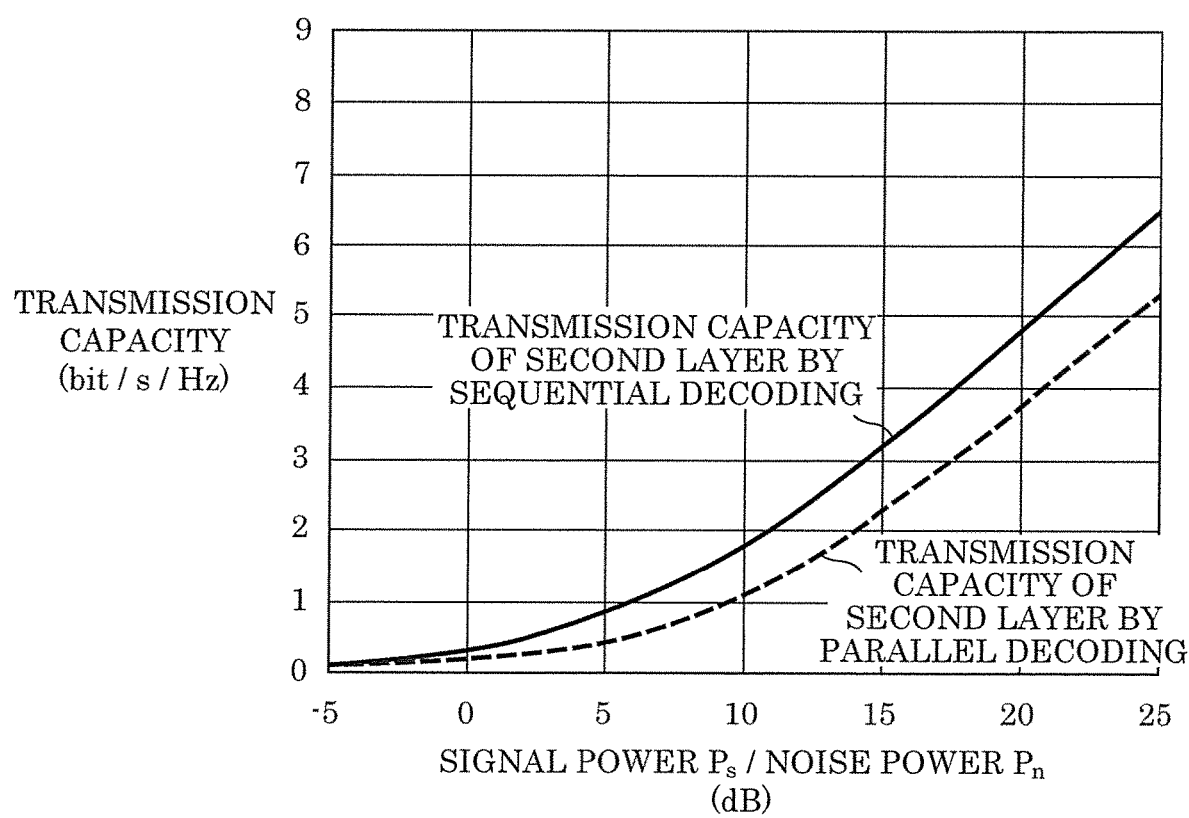
FIG. 10 is a diagram showing an example result of simulation to compare sequential decoding and parallel decoding in superposition coding.

FIG. 10 shows an example simulation result of the transmission capacity of the second layer when the ratio between signal power $P_{s1}$ of the first layer and signal power $P_{s2}$ of the second layer is $P_{s1}:P_{s2}=2:1$. In FIG. 10, the lateral axis represents as dB(decibel) the ratio of signal power $P_s$ to noise power $P_n$ (SNR), and the vertical axis represents transmission capacity. In FIG. 10, the solid line indicates the transmission capacity of the second layer when sequential decoding is performed, and the broken line indicates the transmission capacity of the second layer when parallel decoding is performed.

As FIG. 10 shows, in the decoding of the second layer, parallel decoding involves an increased SNR with respect to the same transmission capacity and a decreased transmission capacity with respect to the same SNR, compared to sequential decoding.

As described above, reception device 300 according to the present embodiment that performs parallel decoding has lower performance in decoding the second data series transmitted on the second layer than that of reception device 200 that performs sequential decoding. However, reception device 300 reduces the number of structural components required for decoding the second layer.

More specifically, reception device 300 eliminates the need for encoder 214, interleaver 215, mapper 216, and multiplier 217 that are required by reception device 200 shown in FIG. 2 performing sequential decoding to reproduce the modulated symbol stream of the first layer. Reception device 300 also eliminates the need for delayer 218 that delays the received signal and subtractor 219 that removes the components of the modulated symbols in the first layer reproduced from the received signal.

The circuit size can be thus reduced. Reception device 300 also requires a smaller number of arithmetic computations and lower power consumption than are required by reception device 200.

Reception device 200 shown in FIG. 2 that performs sequential decoding demodulates the first layer in the received signal to obtain the first data series, generates the first modulated symbol stream from the obtained first data series, and then starts demodulating the second layer in the received signal to obtain the second data series. Meanwhile, reception device 300 according to the present embodiment that performs parallel decoding is capable of simultaneously obtaining the first data series and the second data series in parallel, thereby reducing processing delays.

Alternatively, the reception device may observe the SNR of the received signal to make selection between parallel decoding to be performed when the SNR is high and sequential decoding to be performed when the SNR is low.

In such a case, reception device 200 shown in FIG. 2 includes, for example, a controller that makes selection between sequential decoding and parallel decoding depending on the SNR. Such controller may be included in RF unit 230 or demapper 221. Furthermore, demapper 221 is configured to perform demapping based on the superposition constellation, which is described as an operation performed by demapper 310 shown in FIG. 7, in addition to demapping that is based on the second constellation.

Demapper 221 switches between demapping to be performed on the signal outputted from subtractor 219 on the basis of the second constellation and demapping to be performed on the signal outputted from RF unit 230 on the basis of the superposition constellation. For example, demapper 221 switches between these demapping operations in accordance with a control signal from the controller.

Figure 11:
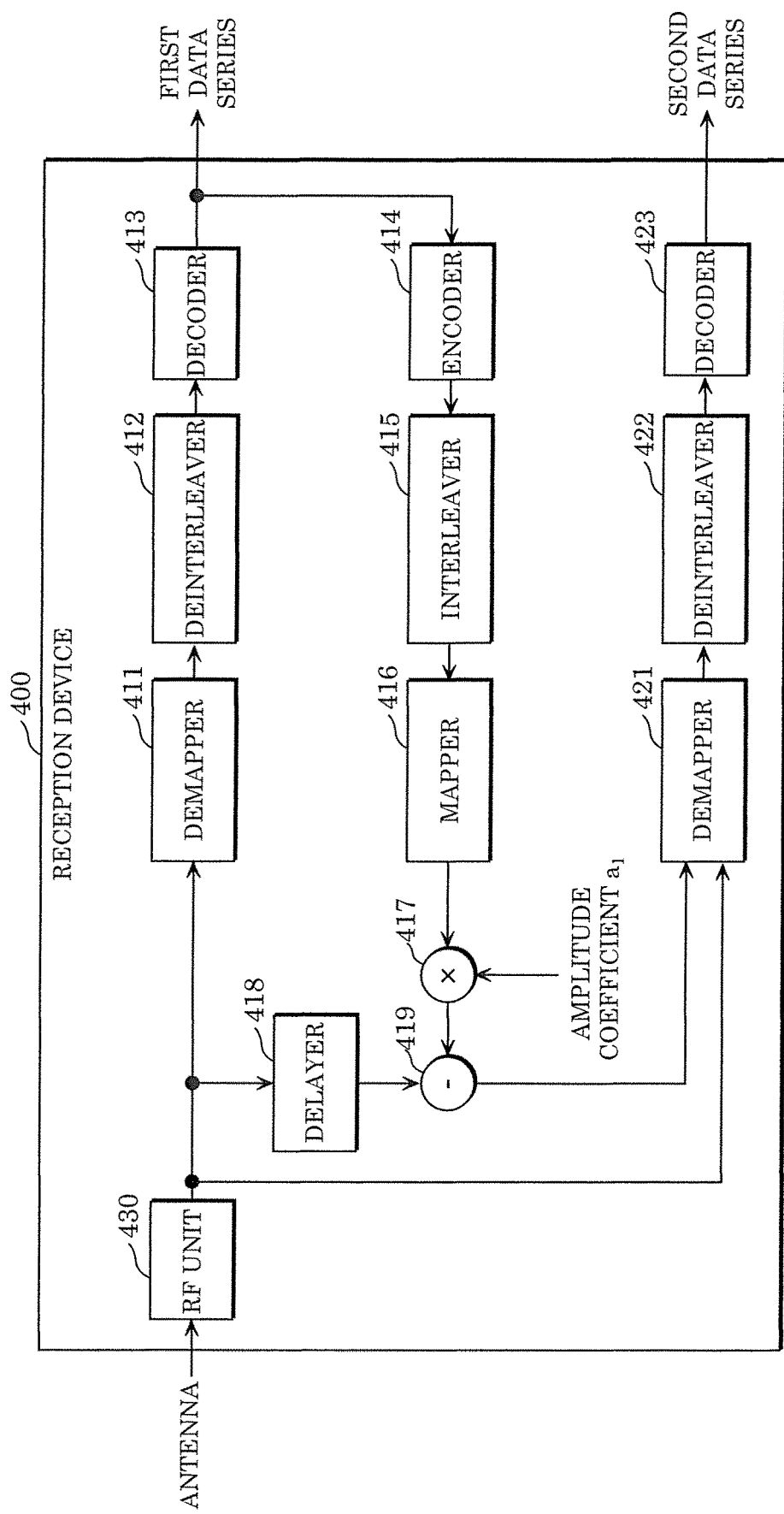
FIG. 11 is a block diagram of a second example configuration of the reception device according to Embodiment 2.

FIG. 11 shows an example configuration of reception device 400 that selectively performs parallel decoding and sequential decoding. Reception device 400 includes RF unit 430, demapper 411, deinterleaver 412, decoder 413, encoder 414, interleaver 415, mapper 416, multiplier 417, delayer 418, subtractor 419, demapper 421, deinterleaver 422, and decoder 423. Structural components of reception device 400 shown in FIG. 11 and structural components of reception device 200 shown in FIG. 2 are basically the same.

However, demapper 421 of reception device 400 performs demapping that is based on the superposition constellation in addition to demapping that is based on the second constellation of the second mapping scheme. For example, depending on the SNR, demapper 421 switches between demapping to be performed on the signal outputted from subtractor 419 on the basis of the second constellation and demapping to be performed on the signal outputted from RF unit 430 on the basis of the superposition constellation.

Although the example shown in FIG. 11 omits a controller that makes selection between sequential decoding and parallel decoding depending on the SNR, the controller may be included in demapper 421, in RF unit 430, or in reception device 400 as a new structural component.

Figure 12:
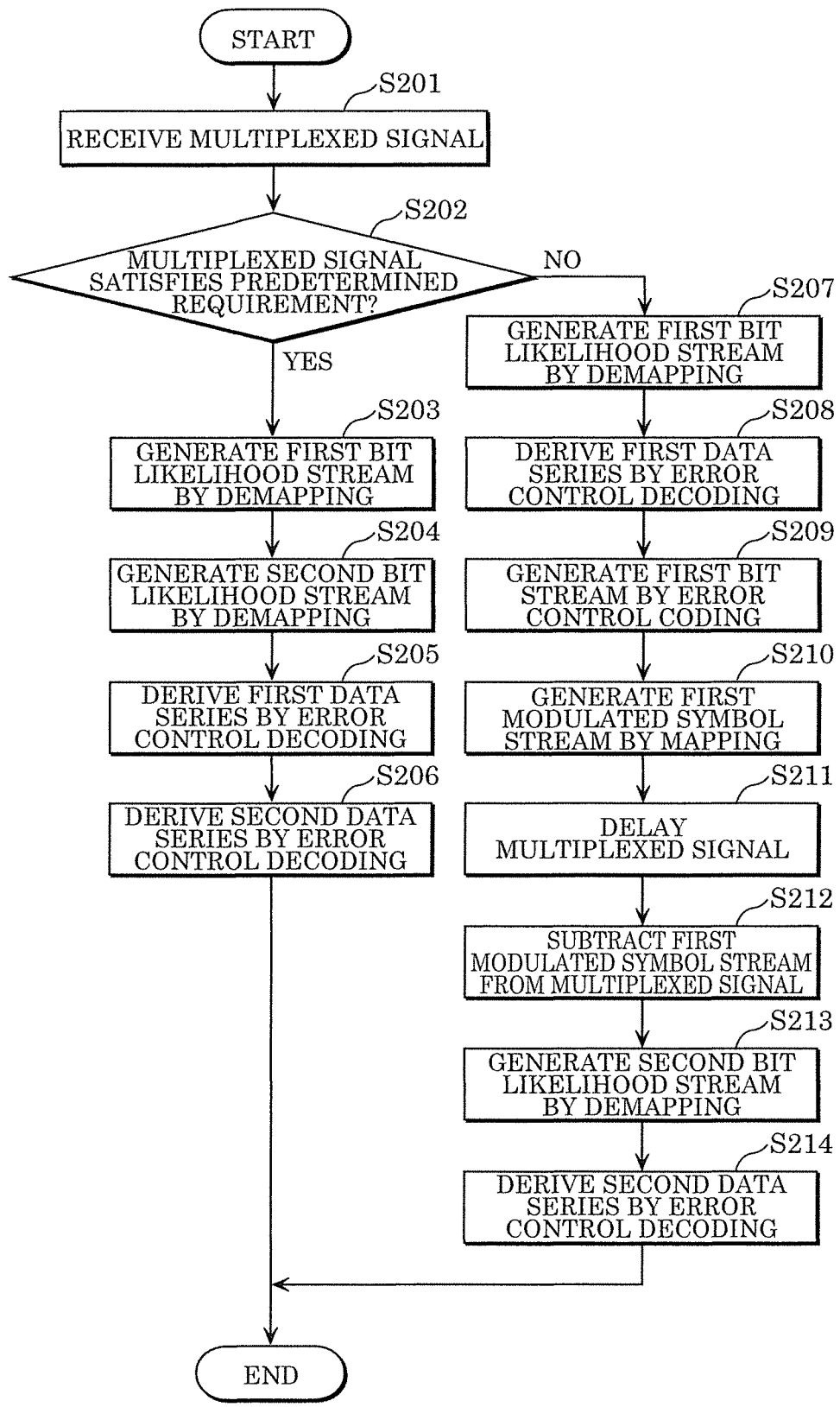
FIG. 12 is a flowchart of a second example of reception operations according to Embodiment 2.

FIG. 12 is a flowchart of example operations performed by reception device 400. First, RF unit 430 receives the multiplexed signal into which the first data series and the second data series are multiplexed (S201). Then, RF unit 430 determines whether the multiplexed signal satisfies a predetermined requirement. The predetermined requirement, for example, is that the SNR should be higher than a predetermined threshold.

When the multiplexed signal satisfies the predetermined requirement (Yes in S202), demapper 411 demaps the multiplexed signal to generate the first bit likelihood stream of the first data series (S203). Also, demapper 421 demaps the multiplexed signal to generate the second bit likelihood stream of the second data series (S204). Deinterleaver 412 may deinterleave such generated first bit likelihood stream. Also, deinterleaver 422 may deinterleave such generated second bit likelihood stream.

Decoder 413 performs error control decoding on the first bit likelihood stream to derive the first data series (S205). Also, decoder 423 performs error control decoding on the second bit likelihood stream to derive the second data series (S206).

These operations (S203 to S206) are basically the same as the operations (S102 to S105) shown in FIG. 9.

Meanwhile, when the multiplexed signal fails to satisfy the predetermined requirement (No in S202), demapper 411 demaps the multiplexed signal to generate the first bit likelihood stream of the first data series (S207). Deinterleaver 412 may deinterleave such generated first bit likelihood stream. Then, decoder 413 performs error control decoding on the first bit likelihood stream to derive the first data series (S208).

Next, encoder 414 performs error control coding on the first data series to generate the first bit stream (S209). Interleaver 415 may interleave such generated first bit stream. Then, mapper 416 maps the first bit stream to generate the first modulated symbol stream (S210). Multiplier 417 may multiply the first modulated symbol stream by amplitude coefficient $a_1$.

Delayer 418 delays the multiplexed signal until the first modulated symbol stream is generated (S211). Then, subtractor 419 subtracts the first modulated symbol stream from the multiplexed signal (S212).

Next, demapper 421 demaps the multiplexed signal from which the first modulated symbol stream has been subtracted to generate the second bit likelihood stream (S213). Deinterleaver 422 may deinterleave such generated second bit likelihood stream. Then, decoder 423 performs error control decoding on the second bit likelihood stream to derive the second data series (S214).

Through these operations, reception device 400 performs parallel decoding when the SNR is high, thereby reducing the number of arithmetic computations and power consumption. Reception device 400 also performs parallel decoding when the SNR is high, thereby reducing processing delays. Meanwhile, reception device 400 performs sequential decoding when the SNR is low, thereby increasing the possibility of correctly decoding the second data series.

Note that the first mapping scheme and the second mapping scheme according to the present embodiment are basically the same as the first mapping scheme and the second mapping scheme according to Embodiment 1. Stated differently, the first constellation and the second constellation according to the present embodiment are basically the same as the first constellation and the second constellation according to Embodiment 1. Any one of a uniform constellation and a non-uniform constellation may be used as the second mapping scheme.

Embodiment 3

<Variation of Superposition Coding (Modified Superposition Coding)>

The present embodiment describes a method of multiplexing and transmitting a plurality of data series by a variation of superposition coding (modified superposition codding), which is a modified version of the above-described superposition coding.

Figure 13:
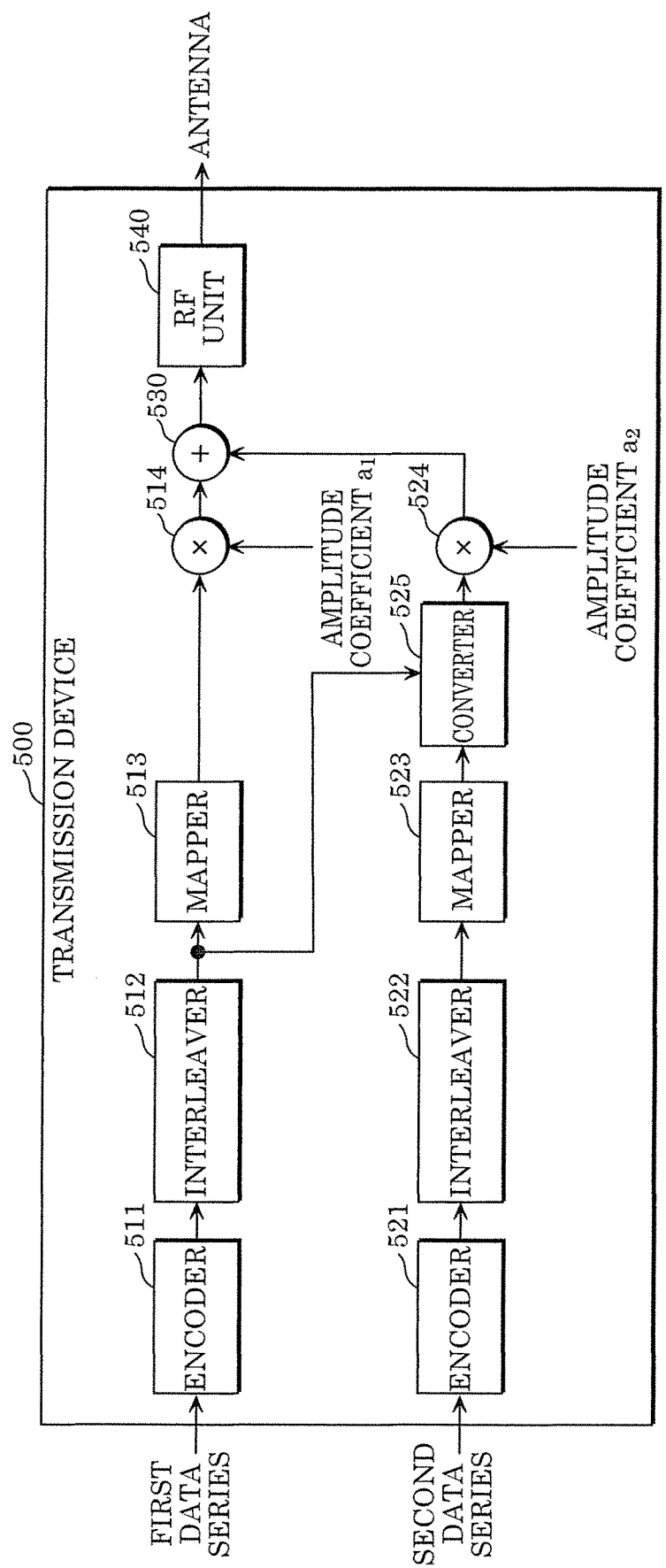
FIG. 13 is a block diagram of a first example configuration of a transmission device according to Embodiment 3.

FIG. 13 shows an example configuration of transmission device 500 that multiplexes two data series onto two layers by the variation of superposition coding, and transmits a multiplexed data series. The configuration and operation of transmission device 500 will be described with reference to FIG. 13.

Transmission device 500 includes encoder 511, interleaver 512, mapper 513, multiplier 514, encoder 521, interleaver 522, mapper 523, converter 525, multiplier 524, adder 530, and RF unit 540. These structural components may also be implemented as dedicated or general-purpose circuits. Multiplier 514, multiplier 524, and adder 530 can also be represented collectively as a superposition unit. RF unit 540 can also be represented as a transmitter. RF unit 540 may include an antenna.

Encoder 511 encodes an inputted first data series on the basis of a first error control coding scheme to generate a first bit stream. Interleaver 512 permutes the bits in the first bit stream generated by encoder 511 on the basis of a first permutation rule. Such permutation is also referred to as interleaving.

Mapper 513 maps the first bit stream permuted by interleaver 512 in accordance with a first mapping scheme to generate a first modulated symbol stream that includes a plurality of first modulated symbols. In the mapping in accordance with the first mapping scheme, mapper 513 maps each group of bits that includes a first number of bits in the first bit stream onto one of the signal points in a first constellation in accordance with the values of such group of bits.

When PSK modulation such as BPSK and QPSK, or QAM modulation such as 16QAM and 64QAM is used as the first mapping scheme, each first modulated symbol can be represented by a complex number, for example, with the real part representing the magnitude of the in-phase component and the imaginary part representing the magnitude of the orthogonal component. Meanwhile, when PAM modulation is used as the first mapping scheme, each first modulated symbol can be represented by a real number.

Encoder 521 encodes an inputted second data series on the basis of a second error control coding scheme to generate a second bit stream. Interleaver 522 permutes the bits in the second bit stream generated by encoder 521 on the basis of a second permutation rule. Such permutation is also referred to as interleaving.

Mapper 523 maps the second bit stream permuted by interleaver 522 in accordance with a second mapping scheme to generate a second modulated symbol stream that includes a plurality of second modulated symbols. In the mapping in accordance with the second mapping scheme, mapper 523 maps each group of bits that includes a second number of bits in the second bit stream onto one of the signal points in a second constellation in accordance with the values of such group of bits.

When PSK modulation such as BPSK and QPSK, or QAM modulation such as 16QAM and 64QAM is used as the second mapping scheme, each second modulated symbol can be represented by a complex number, for example, with the real part representing the magnitude of the in-phase component and the imaginary part representing the magnitude of the orthogonal component. Meanwhile, when PAM modulation is used as the second mapping scheme, each second modulated symbol can be represented by a real number. Any one of a uniform constellation and a non-uniform constellation may be used as the second mapping scheme.

Converter 525 converts each second modulated symbol to be superposed with the corresponding first modulated symbol, on the basis of the values of the bits used to generate such first modulated symbol. Through this, converter 525 converts the second modulated symbol stream.

Multiplier 514 multiplies each first modulated symbol in the first modulated symbol stream by first amplitude coefficient $a_1$. Multiplier 524 multiplies, by second amplitude coefficient $a_2$, each second modulated symbol in the second modulated symbol stream converted by converter 525. Adder 530 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 540 sends the generated superposed modulated symbol stream as a signal. More specifically, RF unit 540 generates, from the superposed modulated symbol stream generated by adder 530, a radio-frequency signal as a signal corresponding to the superposed modulated symbol stream to send such radio-frequency signal from the antenna.

Stated differently, the superposition unit constituted by multiplier 514, multiplier 524, and adder 530 superposes the first modulated symbol stream and the second modulated symbol stream at a predetermined amplitude ratio, thereby generating a multiplexed signal into which the first data series and the second data series are multiplexed. Subsequently, RF unit 540 sends the multiplexed signal. Note that the multiplexed signal corresponds to the superposed modulated symbol stream. Also note that the predetermined amplitude ratio may be 1:1, and that the multiplication may be omitted.

The following shows an example case in which QPSK is used as the first mapping scheme to describe the operation of converter 525.

For example, when $S_1(t)$ is the t-th modulated symbol in the first modulated symbol stream generated by mapper 513, and $b_1(t)$ and $b_2(t)$ are a plurality of bits to be mapped onto $S_1(t)$, modulated symbol $S_1(t)$ is given by Equation 6.

[Math. 6]

$$S_1(t) = \frac{(2 \cdot b_1(t) - 1) + i \cdot (2 \cdot b_2(t) - 1)}{\sqrt{2}} \quad \text{(Equation 6)}$$

Here, i denotes the imaginary unit. Modulated symbol $S_1(t)$ may also be given by an equation in which the polarity (positive/negative) of one of or both of the real part and the imaginary part of Equation 6 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 525 converts, into, $S'_2(t)$, the t-th modulated symbol $S_2(t)$ in the second modulated symbol stream generated by mapper 523, on the basis of $b_1(t)$ and $b_2(t)$ as shown by Equation 7.

[Math. 7]

$$S'_2(t) = (-1)^{b1(t)} \cdot \text{Re}[S_2(t)] + i \cdot (-1)^{b2(t)} \cdot \text{Im}[S_2(t)] \quad \text{(Equation 7)}$$

Here, $S'_2(t)$ is the converted t-th modulated symbol in the second modulated symbol stream. $\text{Re}[S_2(t)]$ is the value of the real part of $S_2(t)$, and $\text{Im}[S_2(t)]$ is the value of the imaginary part of $S_2(t)$. Modulated symbol $S'_2(t)$ may be given by an equation in which the polarity of one of or both of the real part and the imaginary part of Equation 7 are reversed.

As described above, the variation of superposition coding controls the polarities of the real part and the imaginary part of each second modulated symbol in accordance with the values of the bits to be mapped onto the first modulated symbol that is superposed with such second modulated symbol. Note that the polarities of the real part and the imaginary part of each second modulated symbol may be controlled in accordance with the first modulated symbol that is superposed with such second modulated symbol. Also, the polarity of one of the real part and the imaginary part of each second modulated symbol may be controlled, or the polarities of both the real part and the imaginary part of each second modulated symbol may be controlled.

Figure 14:
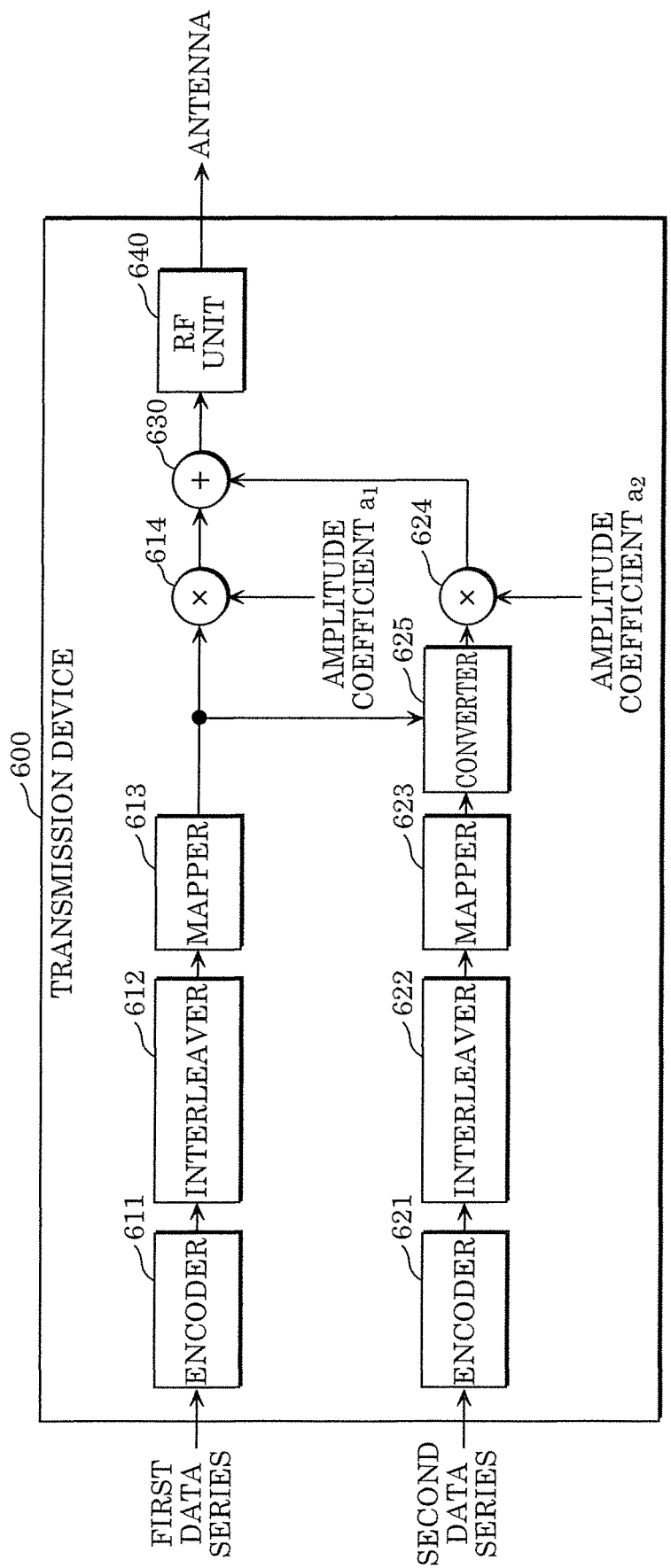
FIG. 14 is a block diagram of a second example configuration of the transmission device according to Embodiment 3.

FIG. 14 shows an example configuration of transmission device 600 that multiplexes two data series onto two layers by the variation of superposition coding, and transmits the multiplexed data series. The configuration of transmission device 600 is different from the configuration of transmission device 500. The configuration and operation of transmission device 600 will be described with reference to FIG. 14.

Transmission device 600 includes encoder 611, interleaver 612, mapper 613, multiplier 614, encoder 621, interleaver 622, mapper 623, converter 625, multiplier 624, adder 630, and RF unit 640. These structural components may also be implemented as dedicated or general-purpose circuits. Multiplier 614, multiplier 624, and adder 630 can also be represented collectively as a superposition unit. RF unit 640 can also be represented as a transmitter. RF unit 640 may include an antenna.

Encoder 611 encodes an inputted first data series on the basis of a first error control coding scheme to generate a first bit stream. Interleaver 612 permutes the bits in the first bit stream generated by encoder 611 on the basis of a first permutation rule. Such permutation is also referred to as interleaving.

Mapper 613 maps the first bit stream permuted by interleaver 612 in accordance with a first mapping scheme to generate a first modulated symbol stream that includes a plurality of first modulated symbols. In the mapping in accordance with the first mapping scheme, mapper 613 maps each group of bits that includes a first number of bits in the first bit stream onto one of the signal points in a first constellation in accordance with the values of such group of bits.

Encoder 621 encodes an inputted second data series on the basis of a second error control coding scheme to generate a second bit stream. Interleaver 622 permutes the bits in the second bit stream generated by encoder 621 on the basis of a second permutation rule. Such permutation is also referred to as interleaving.

Mapper 623 maps the second bit stream permuted by interleaver 622 in accordance with a second mapping scheme to generate a second modulated symbol stream that includes a plurality of second modulated symbols. In the mapping in accordance with the second mapping scheme, mapper 623 maps each group of bits that includes a second number of bits in the second bit stream onto one of the signal points in a second constellation in accordance with the values of such group of bits.

Converter 625 converts each second modulated symbol to be superposed with the corresponding first modulated symbol, on the basis of the generated first modulated symbol. Through this, converter 625 converts the second modulated symbol stream.

Multiplier 614 multiplies each first modulated symbol in the first modulated symbol stream by first amplitude coefficient $a_1$. Multiplier 624 multiplies, by second amplitude coefficient $a_2$, each second modulated symbol in the second modulated symbol stream converted by converter 625. Adder 630 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 640 sends the generated superposed modulated symbol stream as a signal. More specifically, RF unit 640 generates, from the superposed modulated symbol stream generated by adder 630, a radio-frequency signal as a signal corresponding to the superposed modulated symbol stream to send such radio-frequency signal from the antenna.

Stated differently, the superposition unit constituted by multiplier 614, multiplier 624, and adder 630 superposes the first modulated symbol stream and the second modulated symbol stream at a predetermined amplitude ratio, thereby generating a multiplexed signal into which the first data series and the second data series are multiplexed. Subsequently, RF unit 640 sends the multiplexed signal. Note that the multiplexed signal corresponds to the superposed modulated symbol stream. Also note that the predetermined amplitude ratio may be 1:1, and that the multiplication may be omitted.

The following shows an example case in which QPSK is used as the first mapping scheme to describe the operation of converter 625.

For example, when $S_1(t)$ is the t-th modulated symbol in the first modulated symbol stream generated by mapper 613, and $b_1(t)$ and $b_2(t)$ are a plurality of bits to be mapped onto $S_1(t)$, modulated symbol $S_1(t)$ is given by Equation 8.

[Math. 8]

$$S_1(t) = \frac{(2 \cdot b_1(t) - 1) + i \cdot (2 \cdot b_2(t) - 1)}{\sqrt{2}} \quad \text{(Equation 8)}$$

Here, i denotes the imaginary unit. Modulated symbol $S_1(t)$ may also be given by an equation in which the polarity of one of or both of the real part and the imaginary part of Equation 8 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 625 converts, into $S'_2(t)$, the t-th modulated symbol $S_2(t)$ in the second modulated symbol stream generated by mapper 623, on the basis of modulated symbol $S_1(t)$ as shown by Equation 9.

$$S'_2(t) = -\text{sgn}(Re[S_1(t)]) \cdot Re[S_2(t)] - i \cdot \text{sgn}(Im[S_1(t)]) \cdot Im[S_2(t)] \quad \text{[Math. 9]}$$

Here, $S'_2(t)$ is the converted t-th modulated symbol in the second modulated symbol stream. $Re[S_2(t)]$ is the value of the real part of $S_2(t)$, and $Im[S_2(t)]$ is the value of the imaginary part of $S_2(t)$. Also, $\text{sgn}(Re[S_1(t)])$ is the polarity of the real part of $S_1(t)$, and $\text{sgn}(Im[S_1(t)])$ is the polarity of the imaginary part of $S_1(t)$.

Modulated symbol $S'_2(t)$ may be given by an equation in which the polarity of one of or both of the real part and the imaginary part of Equation 9 are reversed. Note that the conversion that is based on Equation 9 is substantially the same as the conversion that is based on Equation 7.

As described above, the variation of superposition coding controls the polarities of the real part and the imaginary part of each second modulated symbol in accordance with the first modulated symbol that is superposed with such second modulated symbol. Note that the polarities of the real part and the imaginary part of each second modulated symbol may be controlled in accordance with the values of the bits to be mapped onto the first modulated symbol that is superposed with such second modulated symbol. Also, the polarity of one of the real part and the imaginary part of each second modulated symbol may be controlled, or the polarities of both the real part and the imaginary part of each second modulated symbol may be controlled.

Figure 15:
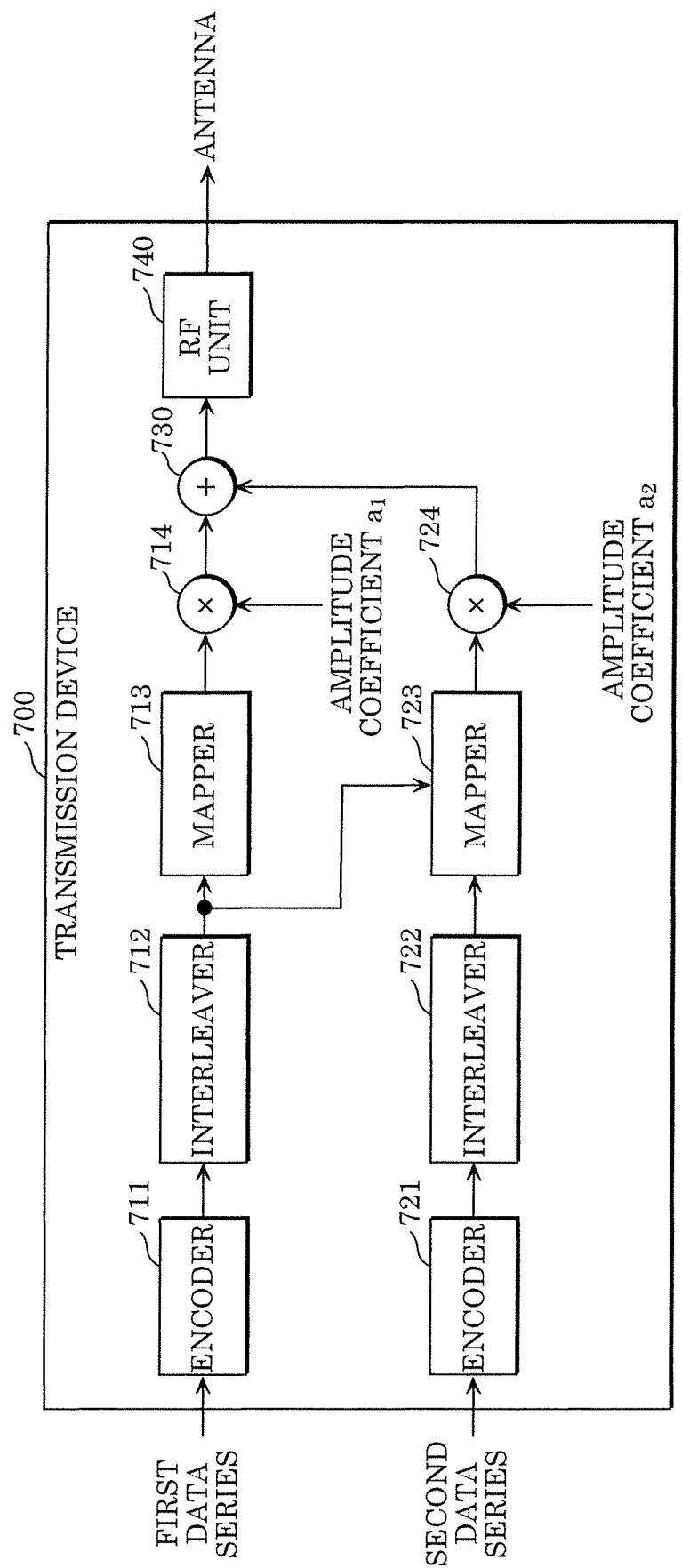
FIG. 15 is a block diagram of a third example configuration of the transmission device according to Embodiment 3.

FIG. 15 shows an example configuration of transmission device 700 that multiplexes two data series onto two layers by the variation of superposition coding, and transmits the multiplexed data series. The configuration of transmission device 700 is different from the configurations of transmission devices 500 and 600. The configuration and operation of transmission device 700 will be described with reference to FIG. 15.

Transmission device 700 includes encoder 711, interleaver 712, mapper 713, multiplier 714, encoder 721, interleaver 722, mapper 723, multiplier 724, adder 730, and RF unit 740. These structural components may also be implemented as dedicated or general-purpose circuits. Multiplier 714, multiplier 724, and adder 730 can also be represented collectively as a superposition unit. RF unit 740 can also be represented as a transmitter. RF unit 740 may include an antenna. Mapper 723 may include a converter.

Encoder 711 encodes an inputted first data series on the basis of a first error control coding scheme to generate a first bit stream. Interleaver 712 permutes the bits in the first bit stream generated by encoder 711 on the basis of a first permutation rule. Such permutation is also referred to as interleaving.

Mapper 713 maps the first bit stream permuted by interleaver 712 in accordance with a first mapping scheme to generate a first modulated symbol stream that includes a plurality of first modulated symbols. In the mapping in accordance with the first mapping scheme, mapper 713 maps each group of bits that includes a first number of bits in the first bit stream onto one of the signal points in a first constellation in accordance with the values of such group of bits.

Encoder 721 encodes an inputted second data series on the basis of a second error control coding scheme to generate a second bit stream. Interleaver 722 permutes the bits in the second bit stream generated by encoder 721 on the basis of a second permutation rule. Such permutation is also referred to as interleaving.

Mapper 723 converts (modifies) a second mapping scheme in accordance with the first bit stream to be mapped to the first modulated symbol stream by mapper 713. Mapper 723 then maps the second bit stream interleaved by interleaver 722 in accordance with the second mapping scheme that has been converted in accordance with the first bit stream. Through these processes, mapper 723 generates a second modulated symbol stream that includes a plurality of second modulated symbols.

In the mapping in accordance with the second mapping scheme, mapper 723 maps each group of bits that includes a second number of bits in the second bit stream onto one of the signal points in a second constellation in accordance with the values of such group of bits.

Multiplier 714 multiplies each first modulated symbol in the first modulated symbol stream by first amplitude coefficient $a_1$. Multiplier 724 multiplies each second modulated symbol in the second modulated symbol stream by second amplitude coefficient $a_2$. Adder 730 superposes first modulated symbols multiplied by first amplitude coefficient $a_1$ and second modulated symbols multiplied by second amplitude coefficient $a_2$ to generate a superposed modulated symbol stream that includes a plurality of superposed modulated symbols.

RF unit 740 sends the generated superposed modulated symbol stream as a signal. More specifically, RF unit 740 generates, from the superposed modulated symbol stream generated by adder 730, a radio-frequency signal as a signal corresponding to the superposed modulated symbol stream to send such radio-frequency signal from the antenna.

Stated differently, the superposition unit constituted by multiplier 714, multiplier 724, and adder 730 superposes the first modulated symbol stream and the second modulated symbol stream at a predetermined amplitude ratio, thereby generating a multiplexed signal into which the first data series and the second data series are multiplexed. Subsequently, RF unit 740 sends the multiplexed signal. Note that the multiplexed signal corresponds to the superposed modulated symbol stream. Also note that the predetermined amplitude ratio may be 1:1, and that the multiplication may be omitted.

The following shows an example case in which QPSK is used as the first mapping scheme to describe the operation of mapper 723.

For example, when $S_1(t)$ is the t-th modulated symbol in the first modulated symbol stream generated by mapper 713, and $b_1(t)$ and $b_2(t)$ are a plurality of bits to be mapped onto $S_1(t)$ modulated symbol $S_1(t)$ is given by Equation 10.

[Math. 10]

$$S_1(t) = \frac{(2 \cdot b_1(t) - 1) + i \cdot (2 \cdot b_2(t) - 1)}{\sqrt{2}} \quad \text{(Equation 10)}$$

Here, i denotes the imaginary unit. Modulated symbol $S_1(t)$ may also be given by an equation in which the polarity of one of or both of the real part and the imaginary part of Equation 10 are reversed. Bit $b_1(t)$ is a bit that contributes to the real part of modulated symbol SAX Bit $b_2(t)$ is a bit that contributes to the imaginary part of modulated symbol $S_1(t)$.

Mapper 723 performs exclusive-OR between $b_1(t)$ and the bit that most contributes to the real part of the second constellation among the bits in the second bit stream inputted from interleaver 722. Mapper 723 also performs exclusive-OR between $b_2(t)$ and the bit that most contributes to the imaginary part of the second constellation among the bits in the second bit stream inputted from interleaver 722. Mapper 723 then maps the second bit stream on which exclusive-OR has been performed, on the basis of the second constellation.

Here, the bit that most contributes to the real part of the second constellation is a bit that causes the polarity of the real part of the second constellation to be reversed, for example, when the value of such bit is reversed from 0 to 1 or from 1 to 0. Stated differently, the bit that most contributes to the real part of the second constellation refers to a bit that causes the negative/positive sign of the value of the real part of each modulated symbol to be reversed, for example, when the value of such bit is reversed from 0 to 1 or from 1 to 0.

Similarly, the bit that most contributes to the imaginary part of the second constellation is a bit that causes the polarity of the imaginary part of the second constellation to be reversed, for example, when the value of such bit is reversed from 0 to 1 or from 1 to 0. Stated differently, the bit that most contributes to the imaginary part of the second constellation refers to a bit that causes the negative/positive sign of the value of the imaginary part of each modulated symbol to be reversed when the value of such bit is reversed from 0 to 1 or from 1 to 0.

In the above description, mapper 723 converts the second bit stream, thereby substantially converting the second mapping scheme (the second constellation). However, mapper 723 may directly convert the second mapping scheme (the second constellation) without converting the second bit stream. Stated differently, mapper 723 may convert the correspondence between groups of bits and signal points in the second constellation.

Also, the conversion performed by mapper 723 may be performed by the converter included in mapper 723.

As described above, the variation of superposition coding controls the polarities of the real part and the imaginary part of each second modulated symbol in accordance with the values of the bits to be mapped onto the first modulated symbol that is superposed with such second modulated symbol. Note that the polarities of the real part and the imaginary part of each second modulated symbol may be controlled in accordance with the first modulated symbol that is superposed with such second modulated symbol. Also, the polarity of one of the real part and the imaginary part of each second modulated symbol may be controlled, or the polarities of both the real part and the imaginary part of each second modulated symbol may be controlled.

<Sequential Decoding of Signal Obtained by Variation of Superposition Coding>

Figure 16:
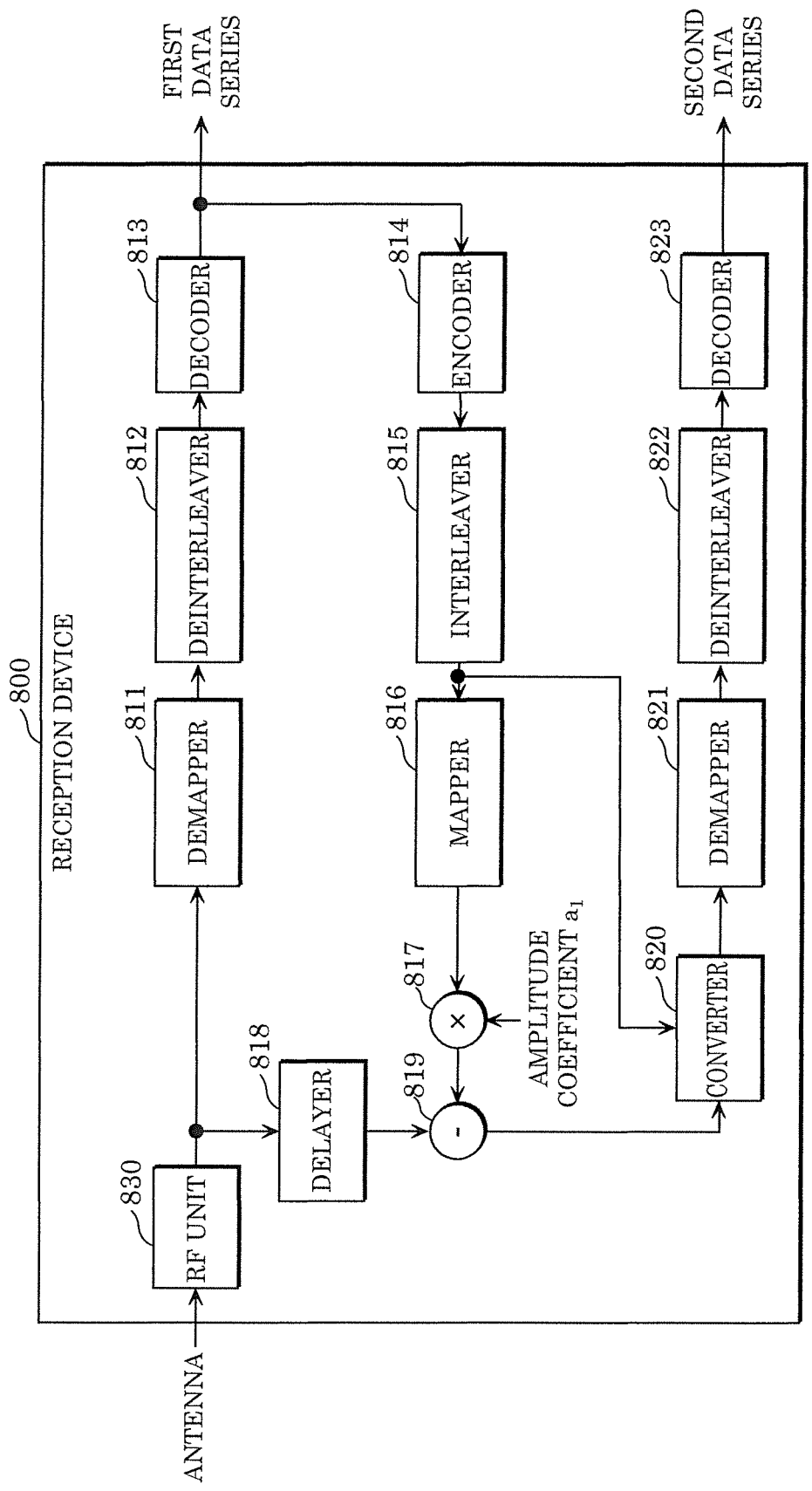
FIG. 16 is a block diagram of a first example configuration of a reception device according to Embodiment 3.

FIG. 16 shows an example configuration of reception device 800 capable of receiving and sequentially decoding the signal on which two data series are multiplexed onto two layers by the above-described variation of superposition coding, and capable of obtaining one of or both of the multiplexed two data series. The configuration and operation of reception device 800 will be described with reference to FIG. 16.

Reception device 800 includes RF unit 830, demapper 811, deinterleaver 812, decoder 813, encoder 814, interleaver 815, mapper 816, multiplier 817, delayer 818, subtractor 819, converter 820, demapper 821, deinterleaver 822, and decoder 823. These structural components may also be implemented as dedicated or general-purpose circuits.

Demapper 811, deinterleaver 812, decoder 813, encoder 814, interleaver 815, mapper 816, multiplier 817, delayer 818, subtractor 819, converter 820, demapper 821, deinterleaver 822, and decoder 823 can also be represented collectively as a derivation unit. RF unit 830 can also be represented as a receiver. RF unit 830 may include an antenna.

Reception device 800 receives by an antenna the multiplexed signal sent from transmission device 500, 600, or 700, and inputs such multiplexed signal into RF unit 830. Stated differently, RF unit 830 receives the multiplexed signal via the antenna. The multiplexed signal received by RF unit 830 is also represented as a received signal, and corresponds to the superposed modulated symbol stream into which the first modulated symbol stream and the second modulated symbol stream are multiplexed. RF unit 830 generates a baseband received signal from the radio-frequency received signal.

Demapper 811 demaps the baseband received signal on the basis of the first constellation of the first mapping scheme to generate the first bit likelihood stream. For example, amplitude coefficient $a_1$ is reflected in the first constellation for demapping.

Deinterleaver 812 permutes the first bit likelihood stream on the basis of a permutation rule that is a reverse rule of the first permutation rule. Such permutation is also referred to as deinterleaving. Decoder 813 performs decoding that is based on the first error control coding scheme by use of the first bit likelihood stream permuted by deinterleaver 812, and outputs the decoding result as the first data series.

Here, of the received signal corresponding to the superposed modulated symbol stream, demapper 811 treats the components corresponding to the second modulated symbols in the second data series as an unknown signal (noise), and performs demapping on the basis of the first constellation of the first mapping scheme.

When only the first data series is to be obtained, reception device 800 terminates the process upon completing the estimation of the first data series. Meanwhile, when the second data series is to be obtained in addition to the first data series, or when only the second data series is to be obtained, reception device 800 performs the processes described below to obtain the second data series.

Encoder 814 encodes the first data series obtained by decoder 813 on the basis of the first error control coding scheme to generate the first bit stream. Interleaver 815 permutes the bits in the first bit stream generated by encoder 814 on the basis of the first permutation rule. Such permutation is also referred to as interleaving.

Mapper 816 maps the first bit stream permuted by interleaver 815 in accordance with the first mapping scheme to generate the first modulated symbol stream that includes a plurality of first modulated symbols. Multiplier 817 multiplies the first modulated symbol stream outputted by mapper 816 by first amplitude coefficient $a_1$.

Delayer 818 delays the received signal outputted from RF unit 830 during the time from when RF unit 830 outputs the baseband received signal to when multiplier 817 outputs the reproduced first modulated symbol stream.

Subtractor 819 subtracts, from the received signal delayed by delayer 818, the first modulated symbol stream multiplied by first amplitude coefficient $a_1$ by multiplier 817. Through this, subtractor 819 removes the components corresponding to the first modulated symbols from the received signal on which the components corresponding to the first modulated symbols and the components and noise corresponding to the second modulated symbols are superposed. Subsequently, subtractor 819 outputs a signal on which the components and noise corresponding to the second modulated symbols are superposed as a signal corresponding to the second modulated symbol stream.

Converter 820 converts the signal outputted from subtractor 819 as a signal corresponding to the second modulated symbol stream by use of the first bit stream reproduced through encoding, interleaving, etc. Demapper 821 demaps the signal outputted by converter 820 on the basis of the second constellation of the second mapping scheme to generate the second bit likelihood stream. For example, amplitude coefficient $a_2$ is reflected in the second constellation for demapping.

Deinterleaver 822 permutes the second bit likelihood stream on the basis of a permutation rule that is a reverse rule of the second permutation rule. Such permutation is also referred to as deinterleaving. Decoder 823 decodes the second bit likelihood stream permuted by deinterleaver 822 on the basis of the second error control coding scheme, and outputs the decoding result as the second data series.

The following shows an example case in which QPSK is used as the first mapping scheme to describe the operation of converter 820.

For example, when $S_1(t)$ is the t-th modulated symbol in the first modulated symbol stream generated by mapper 816, and $b_1(t)$ and $b_2(t)$ are a plurality of bits to be mapped onto $S_1(t)$ modulated symbol $S_1(t)$ is given by Equation 11.

[Math. 11]

$$S_1(t) = \frac{(2 \cdot b_1(t) - 1) + i \cdot (2 \cdot b_2(t) - 1)}{\sqrt{2}} \qquad \text{(Equation 11)}$$

Here, i denotes the imaginary unit. Modulated symbol $S_1(t)$ may also be given by an equation in which the polarity of one of or both of the real part and the imaginary part of Equation 11 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 820 converts, into $S'_2(t)$, signal $S_2(t)$ corresponding to the t-th modulated symbol in the second modulated symbol stream out of the signal outputted by subtractor 819, on the basis of $b_1(t)$ and $b_2(t)$ as shown by Equation 12.

[Math. 12]

$$S'_2(t) = (-1)^{p_1(t)} \cdot \text{Re}[S_2(t)] + i \cdot (-1)^{p_2(t)} \cdot \text{Im}[S_2(t)] \quad \text{(Equation 12)}$$

Here, S'$_2$(t) is the signal that has undergone the conversion. Also, Re[S$_2$(t)] is the value of the real part of S$_2$(t), and Im[S$_2$(t)] is the value of the imaginary part of S$_2$(t). Signal S'$_2$(t) that has undergone the conversion may be given by an equation in which the polarity of one of or both of the real part and the imaginary part of Equation 12 are reversed.

Through the above processes, reception device 800 obtains one of or both of the first data series and the second data series from the signal received by the antenna.

Figure 17:
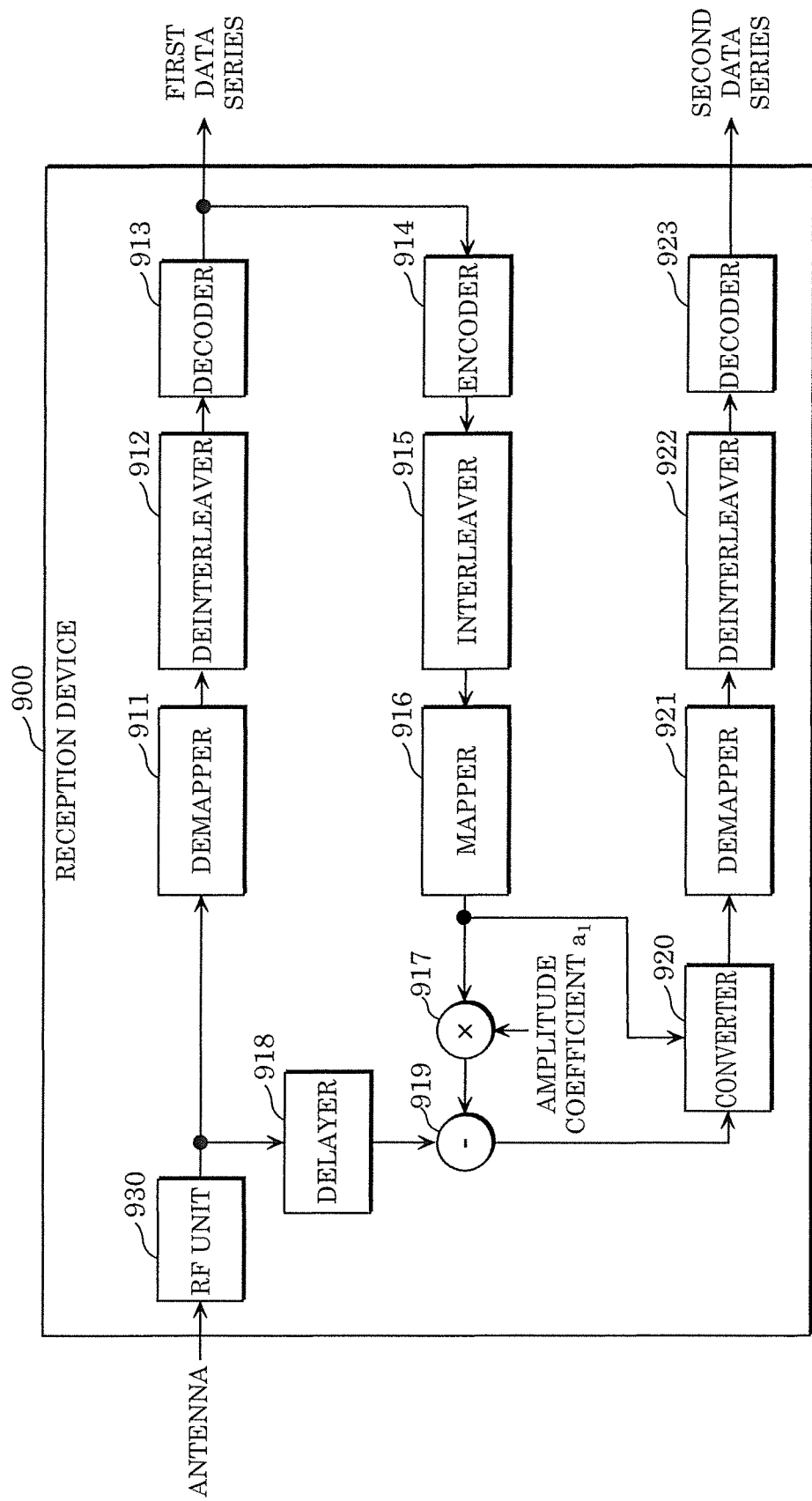
FIG. 17 is a block diagram of a second example configuration of the reception device according to Embodiment 3.

FIG. 17 shows an example configuration of reception device 900 capable of receiving and sequentially decoding the signal on which two data series are multiplexed onto two layers by the above-described variation of superposition coding, and capable of obtaining one of or both of the multiplexed two data series. The configuration of reception device 900 is different from the configuration of reception device 800. The configuration and operation of reception device 900 will be described with reference to FIG. 17.

Reception device 900 includes RF unit 930, demapper 911, deinterleaver 912, decoder 913, encoder 914, interleaver 915, mapper 916, multiplier 917, delayer 918, subtractor 919, converter 920, demapper 921, deinterleaver 922, and decoder 923. These structural components may also be implemented as dedicated or general-purpose circuits.

Demapper 911, deinterleaver 912, decoder 913, encoder 914, interleaver 915, mapper 916, multiplier 917, delayer 918, subtractor 919, converter 920, demapper 921, deinterleaver 922, and decoder 923 can also be represented collectively as a derivation unit. RF unit 930 can also be represented as a receiver. RF unit 930 may include an antenna.

Reception device 900 receives by an antenna the multiplexed signal sent from transmission device 500, 600, or 700, and inputs such multiplexed signal into RF unit 930. Stated differently, RF unit 930 receives the multiplexed signal via the antenna. The multiplexed signal received by RF unit 930 is also represented as a received signal, and corresponds to the superposed modulated symbol stream into which the first modulated symbol stream and the second modulated symbol stream are multiplexed. RF unit 930 generates a baseband received signal from the radio-frequency received signal.

Demapper 911 demaps the baseband received signal on the basis of the first constellation of the first mapping scheme to generate the first bit likelihood stream. For example, amplitude coefficient a$_1$ is reflected in the first constellation for demapping.

Deinterleaver 912 permutes the first bit likelihood stream on the basis of a permutation rule that is a reverse rule of the first permutation rule. Such permutation is also referred to as deinterleaving. Decoder 913 performs decoding that is based on the first error control coding scheme by use of the first bit likelihood stream permuted by deinterleaver 912, and outputs the decoding result as the first data series.

Here, of the received signal corresponding to the superposed modulated symbol stream, demapper 911 treats the components corresponding to the second modulated symbols in the second data series as an unknown signal (noise), and performs demapping on the basis of the first constellation of the first mapping scheme.

When only the first data series is to be obtained, reception device 900 terminates the process upon completing the estimation of the first data series. Meanwhile, when the second data series is to be obtained in addition to the first data series, or when only the second data series is to be obtained, reception device 900 performs the processes described below to obtain the second data series.

Encoder 914 encodes the first data series obtained by decoder 913 on the basis of the first error control coding scheme to generate the first bit stream. Interleaver 915 permutes the bits in the first bit stream generated by encoder 914 on the basis of the first permutation rule. Such permutation is also referred to as interleaving.

Mapper 916 maps the first bit stream permuted by interleaver 915 in accordance with the first mapping scheme to generate the first modulated symbol stream that includes a plurality of first modulated symbols. Multiplier 917 multiplies the first modulated symbol stream outputted by mapper 916 by first amplitude coefficient a$_1$.

Delayer 918 delays the received signal outputted from RF unit 930 during the time from when RF unit 930 outputs the baseband received signal to when multiplier 917 outputs the reproduced first modulated symbol stream.

Subtractor 919 subtracts, from the received signal delayed by delayer 918, the first modulated symbol stream multiplied by first amplitude coefficient a$_1$ multiplier 917. Through this, subtractor 919 removes the components corresponding to the first modulated symbols from the received signal on which the components corresponding to the first modulated symbols and the components and noise corresponding to the second modulated symbols are superposed. Subsequently, subtractor 919 outputs a signal on which the components and noise corresponding to the second modulated symbols are superposed as a signal corresponding to the second modulated symbol stream.

Converter 920 converts the signal outputted from subtractor 919 as a signal corresponding to the second modulated symbol stream by use of the first modulated symbol stream reproduced through encoding, interleaving, mapping, etc. Demapper 921 demaps the signal outputted by converter 920 on the basis of the second constellation of the second mapping scheme to generate the second bit likelihood stream. For example, amplitude coefficient a$_2$ is reflected in the second constellation for demapping.

Deinterleaver 922 permutes the second bit likelihood stream on the basis of a permutation rule that is a reverse rule of the second permutation rule. Such permutation is also referred to as deinterleaving. Decoder 923 decodes the second bit likelihood stream permuted by deinterleaver 922 on the basis of the second error control coding scheme, and outputs the decoding result as the second data series.

The following shows an example case in which QPSK is used as the first mapping scheme to describe the operation of converter 920.

For example, when S$_1$(t) is the t-th modulated symbol in the first modulated symbol stream generated by mapper 916, and b$_1$(t) and b$_2$(t) are a plurality of bits to be mapped onto S$_1$(t) modulated symbol S$_1$(t) is given by Equation 13.

[Math. 13]

$$S_1(t) = \frac{(2 \cdot b_1(t) - 1) + i \cdot (2 \cdot b_2(t) - 1)}{\sqrt{2}} \quad \text{(Equation 13)}$$

Here, i denotes the imaginary unit. Modulated symbol S$_1$(t) may also be given by an equation in which the polarity of one of or both of the real part and the imaginary part of Equation 13 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Converter 920 converts, into $S'_2(t)$, signal $S_2(t)$ corresponding to the t-th modulated symbol in the second modulated symbol stream out of the signal outputted by subtractor 919, on the basis of modulated symbol $S_1(t)$ as shown by Equation 14.

$$S'_2(t) = -\text{sgn}(Re[S_1(t)]) \cdot Re[S_2(t)] - i \cdot \text{sgn}(Im[S_1(t)]) \cdot Im[S_2(t)] \quad \text{[Math. 14]}$$

Here, $S'_2(t)$ is the signal that has undergone the conversion. Also, $Re[S_2(t)]$ is the value of the real part of $S_2(t)$, and $Im[S_2(t)]$ is the value of the imaginary part of $S_2(t)$. Also, $\text{sgn}(Re[S_1(t)])$ is the polarity of the real part of $S_1(t)$, and $\text{sgn}(Im[S_1(t)])$ is the polarity of the imaginary part of $S_1(t)$. Signal $S'_2(t)$ that has undergone the conversion may be given by an equation in which the polarity of one of or both of the real part and the imaginary part of Equation 14 are reversed. Note that the conversion that is based on Equation 14 is substantially the same as the conversion that is based on Equation 12.

Through the above processes, reception device 900 obtains one of or both of the first data series and the second data series from the signal received by the antenna.

Figure 18:
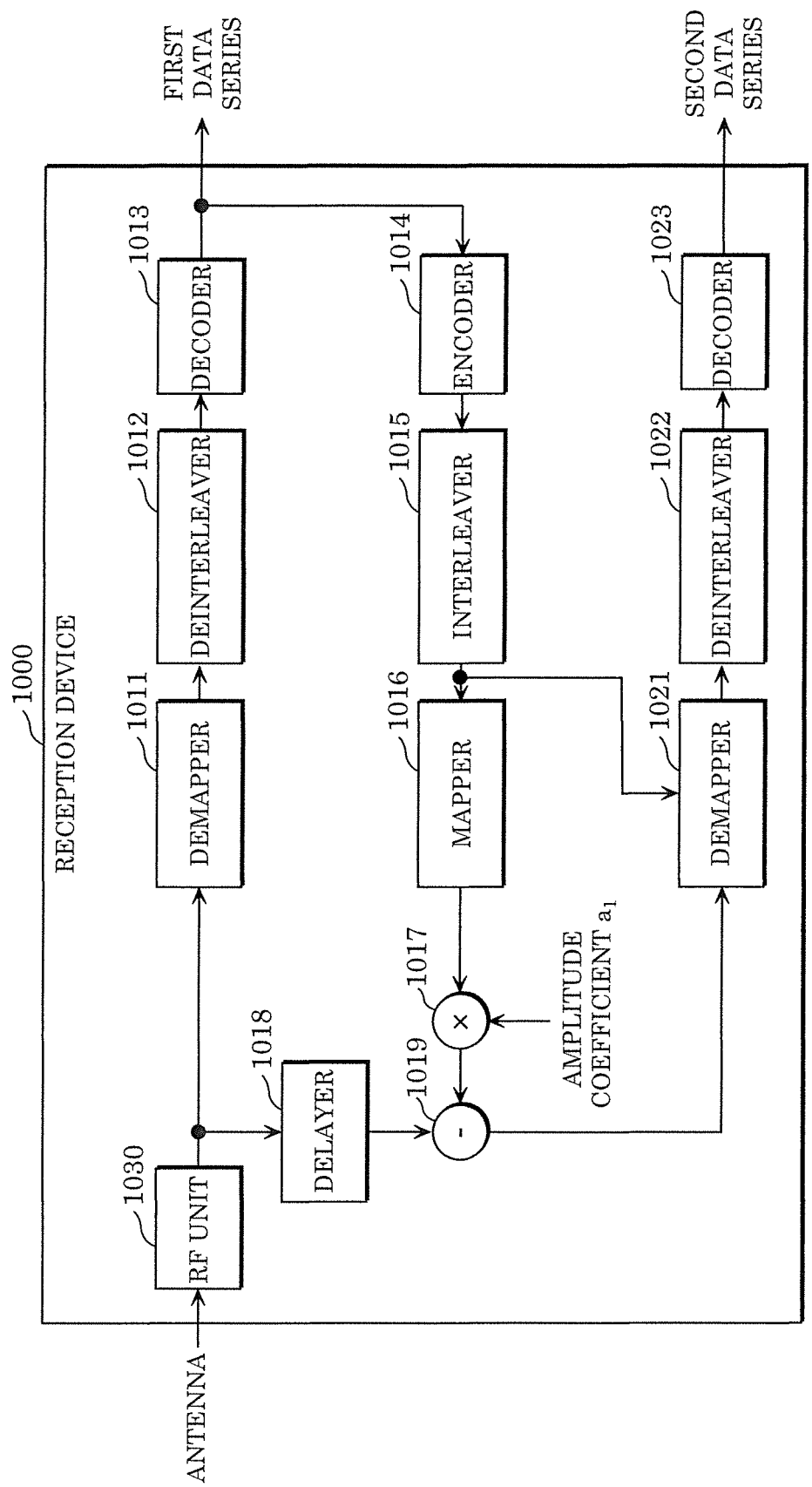
FIG. 18 is a block diagram of a third example configuration of the reception device according to Embodiment 3.

FIG. 18 shows an example configuration of reception device 1000 capable of receiving and sequentially decoding the signal on which two data series are multiplexed onto two layers by the above-described variation of superposition coding, and capable of obtaining one of or both of the multiplexed two data series. The configuration of reception device 1000 is different from the configurations of reception devices 800 and 900. The configuration and operation of reception device 1000 will be described with reference to FIG. 18.

Reception device 1000 includes RF unit 1030, demapper 1011, deinterleaver 1012, decoder 1013, encoder 1014, interleaver 1015, mapper 1016, multiplier 1017, delayer 1018, subtractor 1019, demapper 1021, deinterleaver 1022, and decoder 1023. These structural components may also be implemented as dedicated or general-purpose circuits.

Demapper 1011, deinterleaver 1012, decoder 1013, encoder 1014, interleaver 1015, mapper 1016, multiplier 1017, delayer 1018, subtractor 1019, demapper 1021, deinterleaver 1022, and decoder 1023 can also be represented collectively as a derivation unit. RF unit 1030 can also be represented as a receiver. RF unit 1030 may include an antenna. Demapper 1021 may include a converter.

Reception device 1000 receives by an antenna the multiplexed signal sent from transmission device 500, 600, or 700, and inputs such multiplexed signal into RF unit 1030. Stated differently, RF unit 1030 receives the multiplexed signal via the antenna. The multiplexed signal received by RF unit 1030 is also represented as a received signal, and corresponds to the superposed modulated symbol stream into which the first modulated symbol stream and the second modulated symbol stream are multiplexed. RF unit 1030 generates a baseband received signal from the radio-frequency received signal.

Demapper 1011 demaps the baseband received signal on the basis of the first constellation of the first mapping scheme to generate the first bit likelihood stream. For example, amplitude coefficient $a_1$ is reflected in the first constellation for demapping.

Deinterleaver 1012 permutes the first bit likelihood stream on the basis of a permutation rule that is a reverse rule of the first permutation rule. Such permutation is also referred to as deinterleaving. Decoder 1013 performs decoding that is based on the first error control coding scheme by use of the first bit likelihood stream permuted by deinterleaver 1012, and outputs the decoding result as the first data series.

Here, of the received signal corresponding to the superposed modulated symbol stream, demapper 1011 treats the components corresponding to the second modulated symbols in the second data series as an unknown signal (noise), and performs demapping on the basis of the first constellation of the first mapping scheme.

When only the first data series is to be obtained, reception device 1000 terminates the process upon completing the estimation of the first data series. Meanwhile, when the second data series is to be obtained in addition to the first data series, or when only the second data series is to be obtained, reception device 1000 performs the processes described below to obtain the second data series.

Encoder 1014 encodes the first data series obtained by decoder 1013 on the basis of the first error control coding scheme to generate the first bit stream. Interleaver 1015 permutes the bits in the first bit stream generated by encoder 1014 on the basis of the first permutation rule. Such permutation is also referred to as interleaving.

Mapper 1016 maps the first bit stream permuted by interleaver 1015 in accordance with the first mapping scheme to generate the first modulated symbol stream that includes a plurality of first modulated symbols. Multiplier 1017 multiplies the first modulated symbol stream outputted by mapper 1016 by first amplitude coefficient $a_1$.

Delayer 1018 delays the received signal outputted from RF unit 1030 during the time from when RF unit 1030 outputs the baseband received signal to when multiplier 1017 outputs the reproduced first modulated symbol stream.

Subtractor 1019 subtracts, from the received signal delayed by delayer 1018, the first modulated symbol stream multiplied by first amplitude coefficient $a_1$ by multiplier 1017. Through this, subtractor 1019 removes the components corresponding to the first modulated symbols from the received signal on which the components corresponding to the first modulated symbols and the components and noise corresponding to the second modulated symbols are superposed. Subsequently, subtractor 1019 outputs a signal on which the components and noise corresponding to the second modulated symbols are superposed as a signal corresponding to the second modulated symbol stream.

Demapper 1021 demaps the signal outputted from subtractor 1019 as a signal corresponding to the second modulated symbol stream on the basis of the second constellation of the second mapping scheme to generate the second bit likelihood stream. Such process reflects the first bit stream reproduced through encoding, interleaving, etc. For example, amplitude coefficient $a_2$ is reflected in the second constellation for demapping.

Deinterleaver 1022 permutes the second bit likelihood stream on the basis of a permutation rule that is a reverse rule of the second permutation rule. Such permutation is also referred to as deinterleaving. Decoder 1023 decodes the second bit likelihood stream permuted by deinterleaver 1022 on the basis of the second error control coding scheme, and outputs the decoding result as the second data series.

The following shows an example case in which QPSK is used as the first mapping scheme to describe the operation of demapper 1021.

For example, when $S_1(t)$ is the t-th modulated symbol in the first modulated symbol stream generated by mapper 1016, and $b_1(t)$ and $b_2(t)$ are a plurality of bits to be mapped onto $S_1(t)$, modulated symbol $S_1(t)$ is given by Equation 15.

[Math. 15]

$$S_1(t) = \frac{(2 \cdot b_1(t) - 1) + i \cdot (2 \cdot b_2(t) - 1)}{\sqrt{2}} \quad \text{(Equation 15)}$$

Here, i denotes the imaginary unit. Modulated symbol $S_1(t)$ may also be given by an equation in which the polarity of one of or both of the real part and the imaginary part of Equation 15 are reversed. Bit $b_1(t)$ is a bit that contributes to the real part of modulated symbol $S_1(t)$. Bit $b_2(t)$ is a bit that contributes to the imaginary part of modulated symbol $S_1(t)$.

Demapper 1021 demaps signal $S_2(t)$ outputted from subtractor 1019 as a signal corresponding to the t-th modulated symbol in the second modulated symbol stream on the basis of the second constellation of the second mapping scheme.

Demapper 1021 reverses the bit likelihood corresponding to the bit that most contributes to the real part of the second constellation in accordance with $b_1(t)$ among the bit likelihoods in the bit likelihood stream obtained by demapping. Demapper 1021 also reverses the bit likelihood corresponding to the bit that most contributes to the imaginary part of the second constellation in accordance with $b_2(t)$ among the bit likelihoods in the bit likelihood stream obtained by demapping.

For example, demapper 1021 performs exclusive-OR between $b_1(t)$ and the bit likelihood corresponding to the bit that most contributes to the real part of the second constellation among the bit likelihoods in the bit likelihood stream obtained by demapping. Demapper 1021 also performs exclusive-OR between $b_2(t)$ and the bit likelihood corresponding to the bit that most contributes to the imaginary part of the second constellation among the bit likelihoods in the bit likelihood stream obtained by demapping.

Demapper 1021 then outputs the bit likelihood stream that has undergone the above-described reversal processes as the second bit likelihood stream.

In the above description, demapper 1021 converts the bit likelihood stream, thereby substantially converting the second mapping scheme (the second constellation). However, demapper 1021 may directly convert the second mapping scheme (the second constellation) without converting the bit likelihood stream. Stated differently, demapper 1021 may convert the correspondence between groups of bits and signal points in the second constellation.

Also, the conversion performed by demapper 1021 may be performed by the converter included in demapper 1021.

Through the above processes, reception device 1000 obtains one of or both of the first data series and the second data series from the signal received by the antenna.

<Parallel Decoding of Signal Obtained by Variation of Superposition Coding>

The following describes a reception method for parallel decoding of a signal obtained by the variation of superposition coding according to the present embodiment. The configuration of the transmission device is the same as the configuration of transmission device 500 shown in FIG. 13, transmission device 600 shown in FIG. 14, or transmission device 700 shown in FIG. 15, and thus will not be described. In parallel decoding in the variation of superposition coding, the reception device treats the components of the modulated symbol stream in the first layer as an unknown signal (noise) to decode the second layer, without removing the components of the modulated symbol stream in the first layer included in the received signal.

Figure 19:
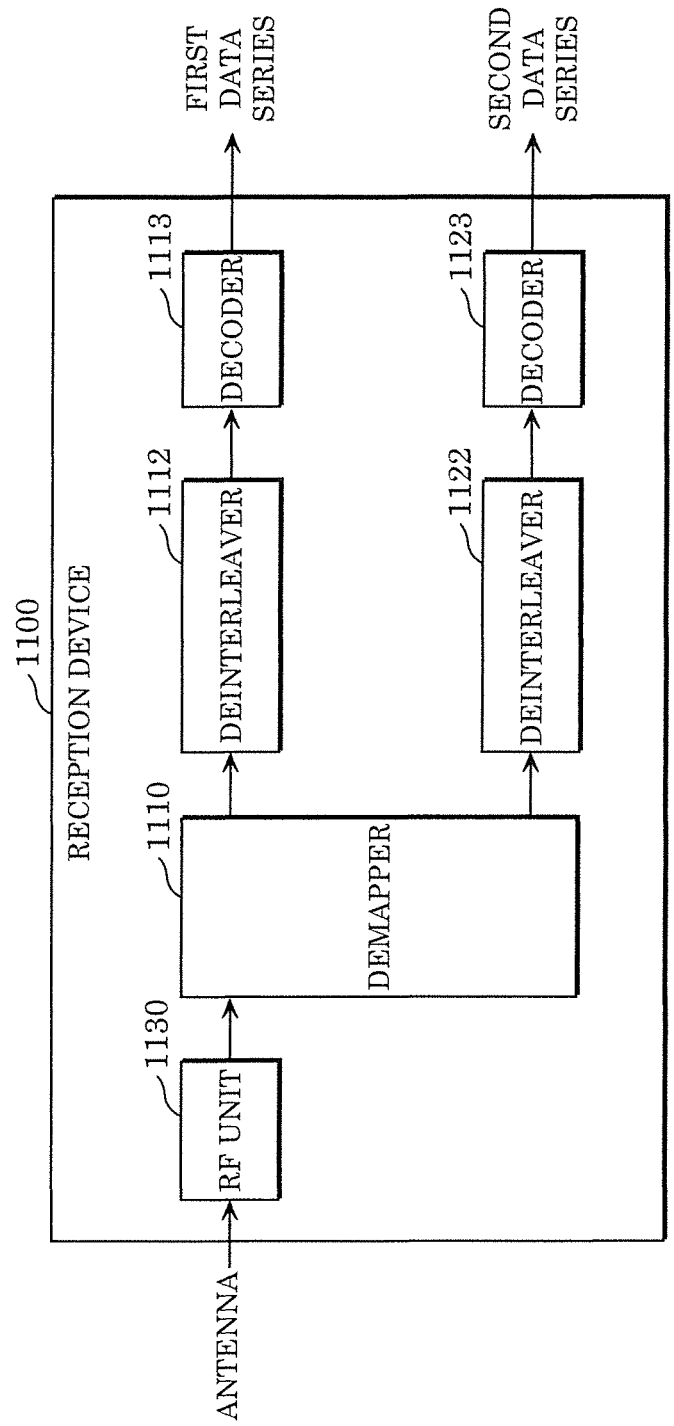
FIG. 19 is a block diagram of a fourth example configuration of the reception device according to Embodiment 3.

FIG. 19 shows an example configuration of reception device 1100 capable of receiving and performing parallel decoding on the signal on which two data series are multiplexed onto two layers by the variation of superposition coding, and capable of obtaining one of or both of the multiplexed two data series. The configuration and operation of reception device 1100 will be described with reference to FIG. 19.

Reception device 1100 includes RF unit 1130, demapper 1110, deinterleaver 1112, decoder 1113, deinterleaver 1122, and decoder 1123. These structural components may also be implemented as dedicated or general-purpose circuits. Demapper 1110, deinterleaver 1112, decoder 1113, deinterleaver 1122, and decoder 1123 can also be represented collectively as a derivation unit. RF unit 1130 can also be represented as a receiver. RF unit 1130 may include an antenna.

Reception device 1100 receives by an antenna the multiplexed signal sent from transmission device 500, 600, or 700, and inputs such multiplexed signal into RF unit 1130. Stated differently, RF unit 1130 receives the multiplexed signal via the antenna. The multiplexed signal received by RF unit 1130 is also represented as a received signal. RF unit 1130 generates a baseband received signal from the radio-frequency received signal.

Demapper 1110 demaps the baseband received signal to generate the first bit likelihood stream and the second bit likelihood stream. For example, demapper 1110 performs demapping on the basis of a variation superposition constellation that shows the arrangement of signal points of superposed modulated symbols obtained by superposing the first modulated symbols and the second modulated symbols by the variation of superposition coding.

The variation superposition constellation is determined in accordance with the first constellation of the first mapping scheme, the second constellation of the second mapping scheme, first amplitude coefficient $a_1$, second amplitude coefficient $a_2$, etc.

Figure 20:
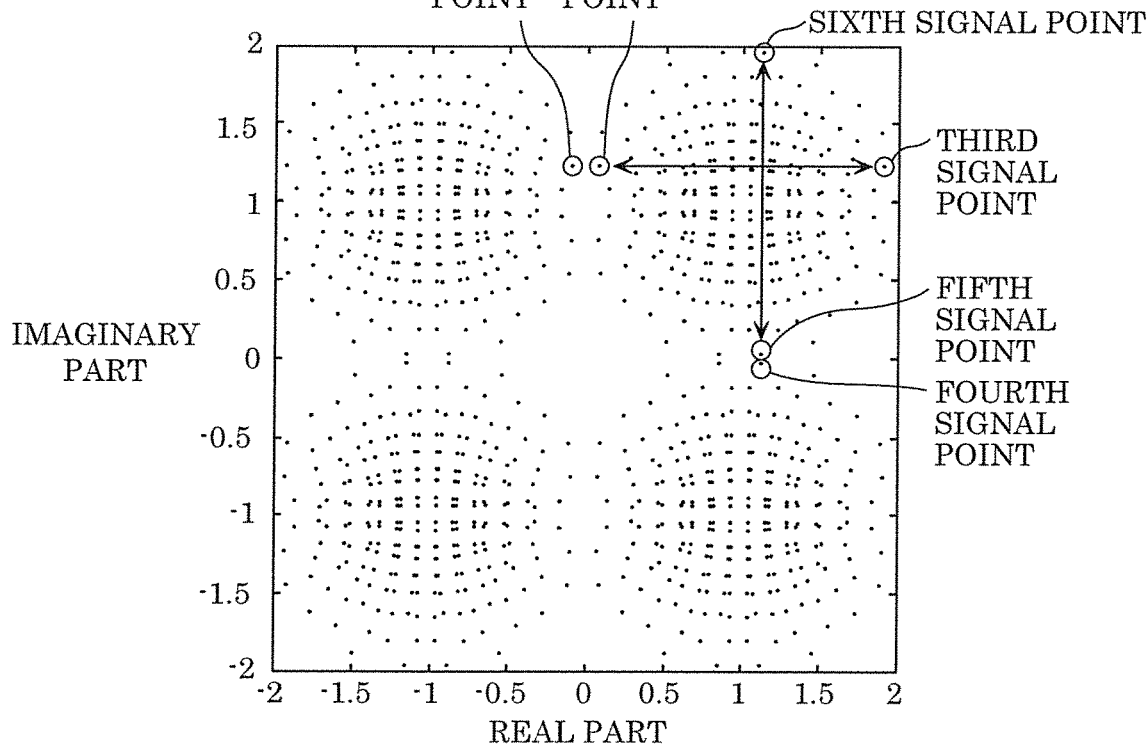
FIG. 20 is a diagram showing an example of a variation superposition constellation according to Embodiment 3.

FIG. 20 shows the variation superposition constellation that supports the variation of superposition coding. More specifically, the variation superposition constellation is a combination of the QPSK constellation shown in FIG. 4 and the Nu-256QAM constellation shown in FIG. 5.

Even more specifically, the Nu-256QAM constellation (256 signal points) is placed on each of the four regions in the complex plane in accordance with the four signal points of the QPSK constellation. These four regions, each corresponding to Nu-256QAM constellation, may partially overlap with each other. The present variation superposition constellation reflects the conversion performed on the second modulated symbol stream.

For example, when the Nu-256QAM constellation is combined with a signal point with a positive real part among the four signal points of the QPSK constellation, the polarity of the real part of the Nu-256QAM constellation is reversed. Also, for example, when the Nu-256QAM constellation is combined with a signal point with a positive imaginary part among the four signal points of the QPSK constellation, the polarity of the imaginary part of the Nu-256QAM constellation is reversed.

More specifically, a first signal point, a second signal point, a third signal point, a fourth signal point, a fifth signal point, and a sixth signal point are shown in FIG. 20. When the polarity of the real part of the Nu-256QAM constellation is not reversed, the first signal point and the third signal point correspond to the same bit values of the second bit stream. Similarly, when the polarity of the imaginary part of the Nu-256QAM constellation is not reversed, the fourth signal point and the sixth signal point correspond to the same bit values of the second bit stream.

When the polarity of the real part of the Nu-256QAM constellation is reversed, the first signal point and the second signal point correspond to the same bit values of the second bit stream. Also, when the polarity of the imaginary part of the Nu-256QAM constellation is reversed, the fourth signal point and the fifth signal point correspond to the same bit values of the second bit stream. Stated differently, such reversal enables a plurality of signal points that correspond to the same bit values of the second bit stream to approach each other and converge. This mitigates the effect of noise on demapping.

Demapper 1110 performs demapping on the basis of the variation superposition constellation as shown in FIG. 20. Stated differently, demapper 1110 generates the first bit likelihood stream with the modulated symbol stream of the second layer remaining unknown, and generates the second bit likelihood stream with the modulated symbol stream of the first layer remaining unknown.

Note that demapper 1110 may use the first constellation of the first mapping scheme to generate the first bit likelihood stream, and may use the above-described variation superposition constellation to generate the second bit likelihood stream.

The first constellation, when used to generate the first bit likelihood stream, enables demapper 1110 to reduce the number of signal points that should be considered in generating the first bit likelihood stream, compared to when the variation superposition constellation is also used to generate the first bit likelihood stream. This thus enables demapper 1110 to reduce the number of arithmetic computations.

Demapper 1110 corresponds, for example, to the first demapper that demaps the received signal to generate the first bit likelihood stream and the second demapper that demaps the received signal to generate the second bit likelihood stream. Demapper 1110 may include the first demapper that demaps the received signal to generate the first bit likelihood stream and the second demapper that demaps the received signal to generate the second bit likelihood stream.

Demapper 1110 may convert the second bit likelihood stream that is generated using not the variation superposition constellation but the superposition constellation, in accordance with the first bit likelihood stream. This enables demapper 1110 to obtain the same second bit likelihood stream as the second bit likelihood stream that is generated using the variation superposition constellation.

Demapper 1110 may convert the multiplexed signal without using the variation superposition constellation to obtain the same second bit likelihood stream as the second bit likelihood stream that is generated using the variation superposition constellation.

Deinterleaver 1112 permutes the first bit likelihood stream on the basis of a permutation rule that is a reverse rule of the first permutation rule. Such permutation is also referred to as deinterleaving. Decoder 1113 decodes the first bit likelihood stream permuted by deinterleaver 1112 on the basis of the first error control coding scheme, and outputs the decoding result as the first data series.

Deinterleaver 1122 permutes the second bit likelihood stream on the basis of a permutation rule that is a reverse rule of the second permutation rule. Such permutation is also referred to as deinterleaving. Decoder 1123 decodes the second bit likelihood stream permuted by deinterleaver 1122 on the basis of the second error control coding scheme, and outputs the decoding result as the second data series.

Through the above processes, reception device 1100 obtains one of or both of the first data series and the second data series from the signal received by the antenna.

Note that transmission devices 500, 600, and 700, and reception devices 800, 900, 1000, and 1100 may omit permutation (interleaving and deinterleaving) as in the case of Embodiment 1. Stated differently, their respective interleavers and deinterleavers are optional structural components, and thus may not be included in these devices.

Interleaving and deinterleaving, however, make a pair. As such, when transmission devices 500, 600, and 700 include their respective interleavers, reception devices 800, 900, 1000, and 1100 basically include their respective deinterleavers and interleavers. Meanwhile, when transmission devices 500, 600, and 700 do not include their respective interleavers, reception devices 800, 900, 1000, and 1100 do not include their respective deinterleavers and interleavers.

Amplitude coefficient $a_1$ may be reflected in the mapping for generating the first modulated symbols performed in reception devices 800, 900, and 1000. In such a case, the multiplication of amplitude coefficient $a_1$ may be omitted. Reception devices 800, 900, and 1000 thus may not include multipliers 817, 917, and 1017, respectively.

Error control coding on the first data series and the second data series may be performed by an external device. In such a case, transmission devices 500, 600, and 700 may omit error control coding, and may not include encoders 511, 521, 611, 621, 711, and 721.

Figure 21:
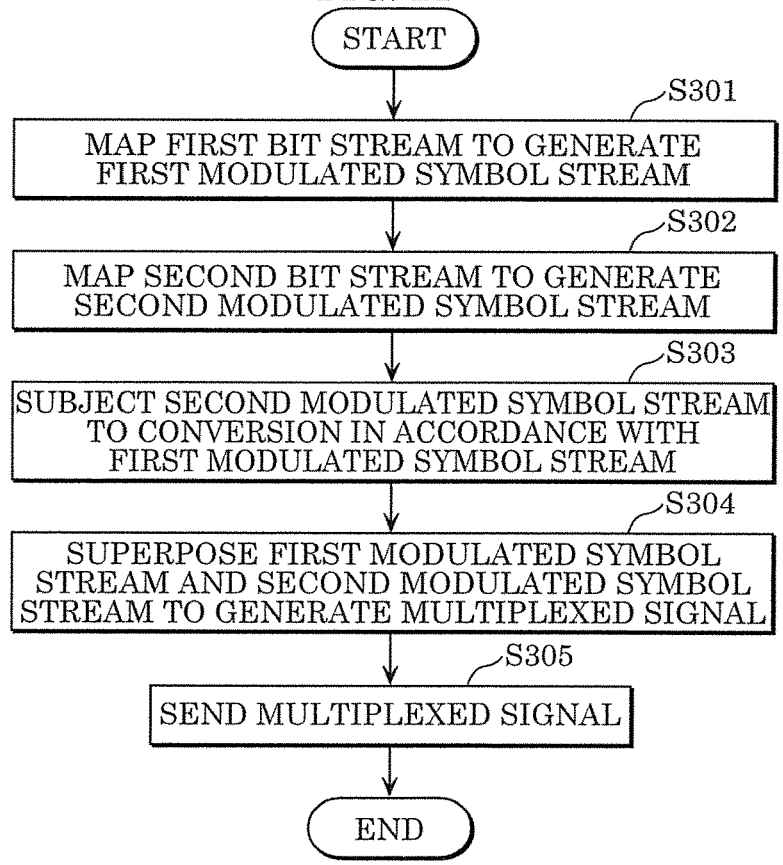
FIG. 21 is a flowchart of an example of transmission operations according to Embodiment 3.

FIG. 21 is a flowchart of example operations performed by transmission device 500. First, mapper 513 maps the first bit stream of the first data series to generate the first modulated symbol stream of the first data series (S301). Then, mapper 523 maps the second bit stream of the second data series to generate the second modulated symbol stream of the second data series (S302).

Converter 525 subjects the second modulated symbol stream to conversion in accordance with the first modulation symbol stream (S303). More specifically, converter 525 converts the second modulated symbol stream in accordance with the first bit stream, thereby subjecting the second modulated symbol stream to conversion in accordance with the first modulated symbol stream.

Next, the superposition unit constituted by first multiplier 514, second multiplier 524, and adder 530 superposes the first modulated symbol stream and the second modulated symbol stream that has been subjected to conversion in accordance with the first modulated symbol stream at a predetermined amplitude ratio, thereby generating the multiplexed signal (S304). RF unit 540 then sends the generated multiplexed signal (S305).

Note that in the above operation example, transmission device 500 converts the second modulated symbol stream in accordance with the first bit stream, thereby subjecting the second modulated symbol stream to conversion in accordance with the first modulated symbol stream (S303). Alternatively, transmission device 500 may convert the second modulated symbol stream in accordance with the first modulated symbol stream, as in the case of transmission device 600, thereby subjecting the second modulated symbol stream to conversion in accordance with the first modulated symbol stream.

Alternatively, as in the case of transmission device 700, transmission device 500 may convert the second bit stream or the second mapping scheme (the second constellation)

used to generate the second modulated symbol stream, in accordance with the first bit stream. Through this, the second modulated symbol stream may be subjected to conversion in accordance with the first modulated symbol stream. In such a case, the second bit stream or the second mapping scheme is converted before the second modulated symbol stream is generated.

Stated differently, the second bit stream, the second mapping scheme, or the second modulated symbol stream may be converted in accordance with the first bit stream or the first modulated symbol stream, thereby subjecting the second modulated symbol stream to conversion in accordance with the first modulated symbol stream.

Converter 525 may subject the second modulated symbol stream to conversion in accordance with the first modulated symbol stream, thereby controlling the polarities of the real part and the imaginary part of each modulated symbol in the second modulated symbol stream. Through this, converter 525 may reverse the polarity of the real part of each second modulated symbol when the real part of the corresponding first modulated symbol satisfies a predetermined real part condition, and may reverse the polarity of the imaginary part of each second modulated symbol when the imaginary part of the corresponding first modulated symbol satisfies a predetermined condition.

The predetermined real part condition may be a condition that the polarity of the real part should be a predetermined polarity of the real part, or may be a condition that the real part should be within a predetermined range of the real part greater than or equal to one. The predetermined range of the real part greater than or equal to one may be a positive range or a negative range. Similarly, the predetermined imaginary part condition may be a condition that the polarity of the imaginary part should be a predetermined polarity of the imaginary part, or may be a condition that the imaginary part should be within a predetermined range of the imaginary part greater than or equal to one. The predetermined range of the imaginary part greater than or equal to one may be a positive range or a negative range.

Figure 22:
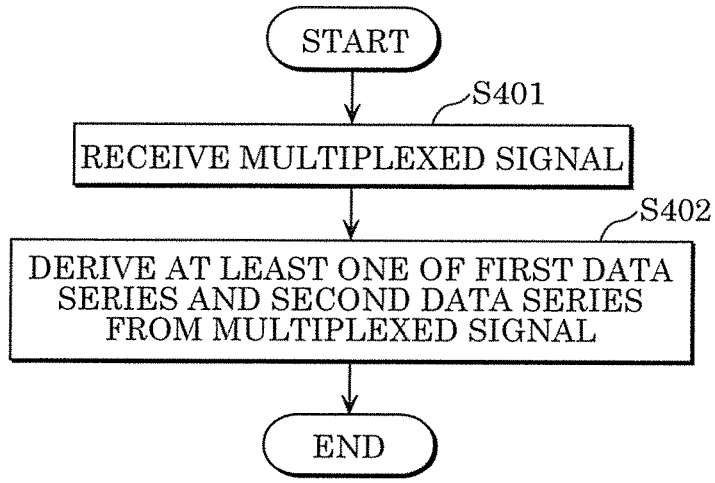
FIG. 22 is a flowchart of an example of reception operations according to Embodiment 3.

FIG. 22 is a flowchart of example operations performed by reception devices 800, 900, 1000, and 1100. First, the receiver receives the multiplexed signal (S401). Here, the receiver is RF unit 830 of reception device 800, RF unit 930 of reception device 900, RF unit 1030 of reception device 1000, or RF unit 1130 of reception device 1100.

The multiplexed signal is a signal into which a plurality of data series including the first data series in the first layer and the second data series in the second layer are multiplexed. The multiplexed signal is also a signal on which the first modulated symbol stream and the second modulated symbol stream are superposed at a predetermined amplitude ratio.

The first modulated symbol stream is a modulated symbol stream that is generated by mapping the first bit stream of the first data series. The second modulated symbol stream is a modulated symbol stream that is generated by mapping the second bit stream of the second data series, and that has been subjected to conversion in accordance with the first modulated symbol stream.

Next, the derivation unit derives at least one of the first data series and the second data series from the multiplexed signal (S402).

The derivation unit of reception device 800 is constituted, for example, by demapper 811, deinterleaver 812, decoder 813, encoder 814, interleaver 815, mapper 816, multiplier 817, delayer 818, subtractor 819, converter 820, demapper 821, deinterleaver 822, and decoder 823.

The derivation unit of reception device 900 is constituted, for example, by demapper 911, deinterleaver 912, decoder 913, encoder 914, interleaver 915, mapper 916, multiplier 917, delayer 918, subtractor 919, converter 920, demapper 921, deinterleaver 922, and decoder 923

The derivation unit of reception device 1000 is constituted, for example, by demapper 1011, deinterleaver 1012, decoder 1013, encoder 1014, interleaver 1015, mapper 1016, multiplier 1017, delayer 1018, subtractor 1019, demapper 1021, deinterleaver 1022, and decoder 1023

The derivation unit of reception device 1100 is constituted, for example, by demapper 1110, deinterleaver 1112, decoder 1113, deinterleaver 1122, and decoder 1123.

In accordance with the above operations, the multiplexed signal is received into which the first modulated symbol stream and the second modulated symbol stream that has been subjected to conversion in accordance with the first modulated symbol stream are multiplexed. Then, at least one of the first data series and the second data series is derived from such multiplexed signal. Stated differently, such configuration enables: the reception of the multiplexed signal that has been superposed in such a manner that reduces performance degradation at the time of parallel decoding: and an efficient derivation of one of or both of the first data series and the second data series from such multiplexed signal.

Reception device 1100 as shown in FIG. 19 that performs parallel decoding has lower performance in decoding the second layer than that of reception devices 800, 900, and 1000 as shown in FIG. 16, FIG. 17, and FIG. 18 that perform sequential decoding.

Figure 23:
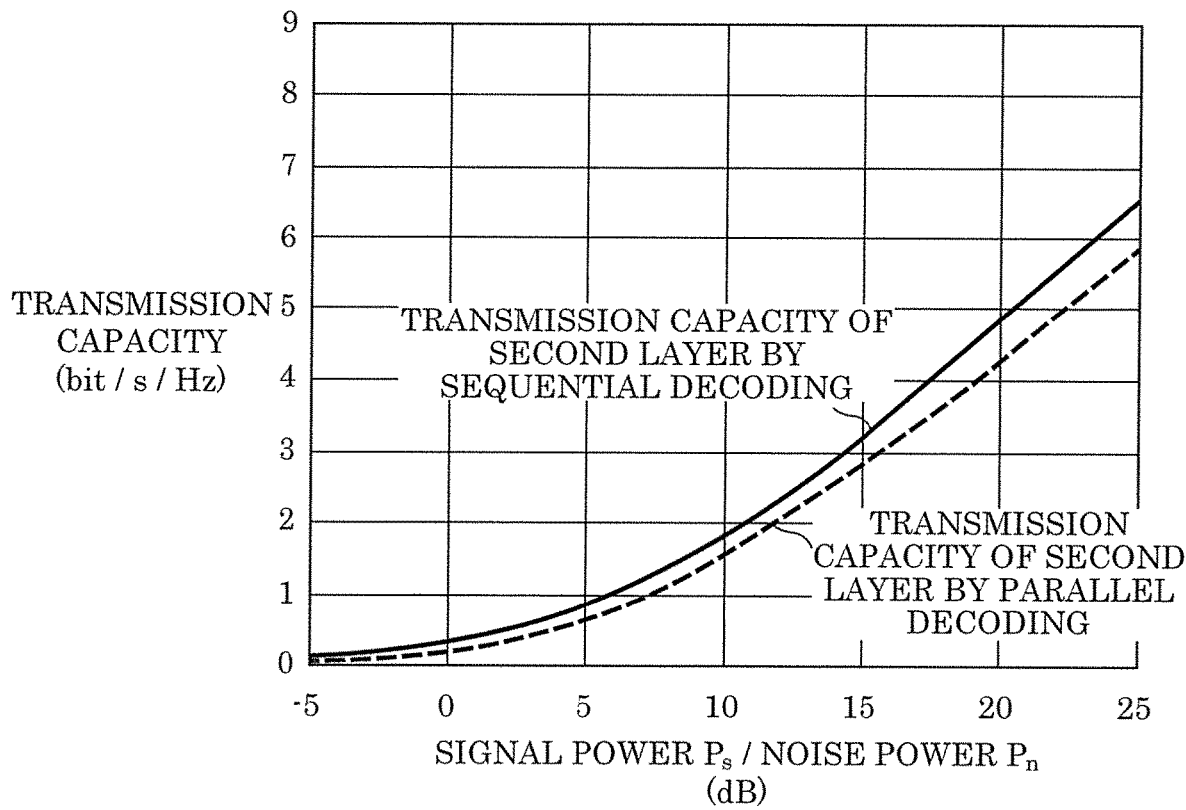
FIG. 23 is a diagram showing an example result of simulation to compare sequential decoding and parallel decoding in a variation of superposition coding.

FIG. 23 shows an example simulation result of the transmission capacity of the second layer when the ratio between signal power $P_{s1}$ of the first layer and signal power $P_{s2}$ of the second layer is $P_{s1}:P_{s2}=2:1$. In FIG. 23, the lateral axis represents as dB(decibel) the ratio of signal power $P_s$ to noise power $P_n$ (SNR), and the vertical axis represents transmission capacity. In FIG. 23, the solid line indicates the transmission capacity of the second layer when sequential decoding is performed, and the broken line indicates the transmission capacity of the second layer when parallel decoding is performed.

As FIG. 23 shows, in the decoding of the second layer, parallel decoding involves an increased SNR with respect to the same transmission capacity and a decreased transmission capacity with respect to the same SNR, compared to sequential decoding.

As described above, reception device 1100 according to the present embodiment that performs parallel decoding has lower performance in decoding the second data series transmitted on the second layer than that of reception devices 800, 900, and 1000 that perform sequential decoding. However, reception device 1100 reduces the number of structural components required to decode the second layer.

More specifically, reception device 1100 eliminates the need for the structural components that are required by reception devices 800, 900, and 1000 shown in FIG. 16, FIG. 17, and FIG. 18 performing sequential decoding to reproduce the modulated symbol stream of the first layer. Stated differently, encoders 814, 914, and 1014, interleavers 815, 915, and 1015, mappers 816, 916, and 1016, and multipliers 817, 917, and 1017 are not required.

Reception device 1100 also eliminates the need for delayers 818, 918, and 1018 that delay the received signal, and subtractors 819, 919, and 1019 that remove the components of the modulated symbols in the first layer reproduced from the received signal.

The circuit size can be thus reduced. Reception device 1100 also requires a smaller number of arithmetic computations and lower power consumption than are required by reception devices 800, 900, and 1000.

Reception devices 800, 900, and 1000 shown in FIG. 16, FIG. 17, and FIG. 18 that perform sequential decoding demodulate the first layer in the received signal to obtain the first data series, and generate the first modulated symbol stream from the obtained first data series. Subsequently, reception devices 800, 900, and 1000 start demodulating the second layer in the received signal to obtain the second data series.

Meanwhile, reception device 1100 according to the present embodiment that performs parallel decoding is capable of simultaneously obtaining the first data series and the second data series in parallel, thereby reducing processing delays.

The reception device may observe the SNR of the received signal to make selection between parallel decoding to be performed when the SNR is high and sequential decoding to be performed when the SNR is low.

In such a case, reception device 800 shown in FIG. 16 includes, for example, a controller that makes selection between sequential decoding and parallel decoding depending on the SNR. Such controller may be included in RF unit 830 or demapper 821. Furthermore, demapper 821 is configured to perform demapping based on the variation superposition constellation, which is described as an operation performed by demapper 1110 shown in FIG. 19, in addition to demapping that is based on the second constellation.

Demapper 821 switches between demapping to be performed on the signal outputted from converter 820 on the basis of the second constellation and demapping to be performed on the signal outputted from RF unit 830 on the basis of the variation superposition constellation. For example, demapper 821 switches between these demapping operations in accordance with a control signal from the controller.

Note that such configuration is also obtained by a combination of reception device 400 shown in FIG. 11, reception device 800 (converter 820, demapper 821, etc.) shown in FIG. 16, and reception device 1100 (demapper 1110, etc.) shown in FIG. 19.

Another configuration is that reception device 900 shown in FIG. 17 includes, for example, a controller that makes selection between sequential decoding and parallel decoding depending on the SNR. Such controller may be included in RF unit 930 or demapper 921. Furthermore, demapper 921 is configured to perform demapping based on the variation superposition constellation, which is described as an operation performed by demapper 1110 shown in FIG. 19, in addition to demapping that is based on the first bit stream and the second constellation.

Demapper 921 switches between demapping to be performed on the signal outputted from converter 920 on the basis of the second constellation and demapping to be performed on the signal outputted from RF unit 930 on the basis of the variation superposition constellation. For example, demapper 921 switches between these demapping operations in accordance with a control signal from the controller.

Note that such configuration is also obtained by a combination of reception device 400 shown in FIG. 11, reception device 900 (converter 920, demapper 921, etc.) shown in FIG. 17, and reception device 1100 (demapper 1110, etc.) shown in FIG. 19.

Still another configuration is that reception device 1000 shown in FIG. 18 includes, for example, a controller that makes selection between sequential decoding and parallel decoding depending on the SNR. Such controller may be included in RF unit 1030 or demapper 1021. Furthermore, demapper 1021 is configured to perform demapping based on the variation superposition constellation, which is described as an operation performed by demapper 1110 shown in FIG. 19, in addition to demapping that is based on the first bit stream and the second constellation.

Demapper 1021 switches between demapping to be performed on the signal outputted from subtractor 1019 on the basis of the second constellation and demapping to be performed on the signal outputted from RF unit 1030 on the basis of the variation superposition constellation. For example, demapper 1021 switches between these demapping operations in accordance with a control signal from the controller.

Note that such configuration is also obtained by a combination of reception device 400 shown in FIG. 11, reception device 1000 (demapper 1021, etc.) shown in FIG. 18, and reception device 1100 (demapper 1110, etc.) shown in FIG. 19.

As described above, reception devices 800, 900, and 1000 perform parallel decoding when the SNR is high, thereby reducing the number of arithmetic computations and power consumption. Reception devices 800, 900, and 1000 also perform parallel decoding when the SNR is high, thereby reducing processing delays. Meanwhile, reception devices 800, 900, and 1000 perform sequential decoding when the SNR is low, thereby increasing the possibility of correctly decoding the second data series.

Comparison between the transmission capacity in the multiplexing scheme utilizing superposition coding shown in FIG. 10 and the transmission capacity in the multiplexing scheme utilizing the variation of superposition coding shown in FIG. 23 presents the findings described below.

The characteristics of the transmission capacities exhibited by sequential decoding (indicated by the solid line) are the same between the multiplexing scheme utilizing superposition coding (FIG. 10) and the multiplexing scheme utilizing the variation of superposition coding (FIG. 23). Meanwhile, the characteristics of the transmission capacities exhibited by parallel decoding (indicated by the broken line) are improved by use of the multiplexing scheme utilizing the variation of superposition coding (FIG. 23) compared to the multiplexing scheme utilizing the superposition coding (FIG. 10). Stated differently, the multiplexing scheme utilizing the variation of superposition coding provides desirable results both in sequential decoding and parallel decoding.

As described above, the reception device according to one aspect of the present disclosure is a reception device that receives a multiplexed signal into which a plurality of data series have been multiplexed by superposition coding, and derives the plurality of data series from the multiplexed signal, the plurality of data series including a first data series in a first layer and a second data series in a second layer. Such reception device includes: a receiver that receives the multiplexed signal; a first demapper that demaps the multiplexed signal, with a second modulated symbol stream of the second data series being included in the multiplexed signal as an undefined signal component, to generate a first bit likelihood stream of the first data series; a second demapper that demaps the multiplexed signal, with a first modulated symbol stream of the first data series being included in the multiplexed signal as an undefined signal component, to generate a second bit likelihood stream of the second data series; a first decoder that performs error control decoding on the first bit likelihood stream to derive the first data series; and a second decoder that performs error control decoding on the second bit likelihood stream to derive the second data series.

This enables the reception device to derive the second data series without waiting for the derivation, etc. of the first data series. The reception device thus can reduce processing delays. Stated differently, the reception device is capable of efficiently performing processing in a multiplexing scheme that utilizes superposition coding.

For example, the multiplexed signal received by the receiver may be a signal on which the first modulated symbol stream and the second modulated symbol stream are superposed at a predetermined amplitude ratio, and in which a polarity of a real part and a polarity of an imaginary part of each modulated symbol in the second modulated symbol stream are controlled in accordance with the first modulated symbol stream, the first modulated symbol stream being generated by mapping a first bit stream of the first data series, the second modulated symbol stream being generated by mapping a second bit stream of the second data series.

This enables the reception device to receive a multiplexed signal of the first modulated symbol stream and the second modulated symbol stream that has been adjusted in accordance with the first modulated symbol stream. This thus enables the reception device to appropriately derive the first data series and the second data series from the multiplexed signal into which the first data series and the second data series are appropriately multiplexed.

For example, the multiplexed signal received by the receiver may be a signal on which a first modulated symbol in the first modulated symbol stream and a second modulated symbol in the second modulated symbol stream are superposed, and in which the polarity of the real part of the second modulated symbol is subjected to a reversal when a real part of the first modulated symbol satisfies a predetermined real part condition and the polarity of the imaginary part of the second modulated symbol is subjected to a reversal when an imaginary part of the first modulated symbol satisfies a predetermined imaginary part condition.

This enables the reception device to receive, as the multiplexed signal, a signal on which the first modulated symbol and the second modulated symbol, a polarity of which has been reversed in accordance with the first modulated symbol, are superposed. The reversal of a polarity of the second modulated symbol enables a plurality of signal points that are associated with the same group of bits in the second data series to approach each other. The reception device is thus capable of appropriately generating the second modulated symbol stream from the multiplexed signal that includes the first modulated symbol stream.

For example, the second demapper may demap the multiplexed signal to generate the second bit likelihood stream, based on a superposition constellation that is a combination of a first constellation used to map the first bit stream and a second constellation used to map the second bit stream, and that reflects the reversal of the polarity of the real part of the second modulated symbol and the reversal of the polarity of the imaginary part of the second modulated symbol.

This enables the reception device to appropriately generate the second modulated symbol stream from the multiplexed signal on the basis of the superposition constellation in which a plurality of signal points associated with the same group of bits come close to each other.

For example, the reception device may further include: an encoder that performs error control coding on the first data series derived by the first decoder to generate a first bit stream of the first data series; a mapper that maps the first bit stream to generate the first modulated symbol stream; a delayer that delays the multiplexed signal received by the receiver for a predetermined time length; and a subtractor that subtracts the first modulated symbol stream from the multiplexed signal delayed by the delayer. The second demapper may demap the multiplexed signal, with the first modulated symbol stream being included in the multiplexed signal as an undefined signal component, to generate the second bit likelihood stream, when a signal-to-noise ratio of the multiplexed signal satisfies a predetermined requirement, and may demap the multiplexed signal from which the first modulated symbol stream has been subtracted to generate the second bit likelihood stream, when the signal-to-noise ratio of the multiplexed signal fails to satisfy the predetermined requirement.

This allows operations to be selectively switched, depending on the signal-to-noise ratio, between generating the second modulated symbol stream form the multiplexed signal from which the first modulated symbol stream remains unremoved and generating the second modulated symbol stream from the multiplexed signal from which the first modulated symbol stream has been removed. This thus enables the reception device to prevent extreme decrease, etc. in the transmission capacity.

The reception method according to another aspect of the present disclosure is a reception method of receiving a multiplexed signal into which a plurality of data series have been multiplexed by superposition coding, and deriving the plurality of data series from the multiplexed signal, the plurality of data series including a first data series in a first layer and a second data series in a second layer. Such reception method includes: receiving the multiplexed signal; demapping the multiplexed signal, with a second modulated symbol stream of the second data series being included in the multiplexed signal as an undefined signal component, to generate a first bit likelihood stream of the first data series; demapping the multiplexed signal, with a first modulated symbol stream of the first data series being included in the multiplexed signal as an undefined signal component, to generate a second bit likelihood stream of the second data series; performing error control decoding on the first bit likelihood stream to derive the first data series; and performing error control decoding on the second bit likelihood stream to derive the second data series.

This enables a reception device, etc. employing this reception method to derive the second data series without waiting for the derivation, etc. of the first data series. The reception device, etc. employing this reception method thus can reduce processing delays. Stated differently, the reception device, etc. employing this reception method is capable of efficiently performing processing in a multiplexing scheme that utilizes superposition coding.

For example, the multiplexed signal may be a signal on which the first modulated symbol stream and the second modulated symbol stream are superposed at a predetermined amplitude ratio, and in which a polarity of a real part and a polarity of an imaginary part of each modulated symbol in the second modulated symbol stream are controlled in accordance with the first modulated symbol stream, the first modulated symbol stream being generated by mapping a first bit stream of the first data series, the second modulated symbol stream being generated by mapping a second bit stream of the second data series.

This enables the reception device, etc. employing this reception method to receive a multiplexed signal of the first modulated symbol stream and the second modulated symbol stream that has been adjusted in accordance with the first modulated symbol stream. This thus enables the reception device, etc. employing this reception method to appropriately derive the first data series and the second data series from the multiplexed signal into which the first data series and the second data series are appropriately multiplexed.

For example, the multiplexed signal may be a signal on which a first modulated symbol in the first modulated symbol stream and a second modulated symbol in the second modulated symbol stream are superposed, and in which the polarity of the real part of the second modulated symbol is subjected to a reversal when a real part of the first modulated symbol satisfies a predetermined real part condition and the polarity of the imaginary part of the second modulated symbol is subjected to a reversal when an imaginary part of the first modulated symbol satisfies a predetermined imaginary part condition.

This enables the reception device, etc. employing this reception method to receive, as the multiplexed signal, a signal on which the first modulated symbol and the second modulated symbol, a polarity of which has been reversed in accordance with the first modulated symbol, are superposed. The reversal of a polarity of the second modulated symbol enables a plurality of signal points that are associated with the same group of bits in the second data series to approach each other. The reception device, etc. employing this reception method is thus capable of appropriately generating the second modulated symbol stream from the multiplexed signal that includes the first modulated symbol stream.

For example, in the generating of the second bit likelihood stream, the multiplexed signal may be demapped to generate the second bit likelihood stream, based on a superposition constellation that is a combination of a first constellation used to map the first bit stream and a second constellation used to map the second bit stream, and that reflects the reversal of the polarity of the real part of the second modulated symbol and the reversal of the polarity of the imaginary part of the second modulated symbol.

This enables the reception device, etc. employing this reception method to appropriately generate the second modulated symbol stream from the multiplexed signal on the basis of the superposition constellation in which a plurality of signal points associated with the same groups of bits come close to each other.

For example, the reception method may further include: performing error control coding on the first data series that has been derived to generate a first bit stream of the first data series; mapping the first bit stream to generate the first modulated symbol stream; delaying the multiplexed signal that has been received for a predetermined time length; and subtracting the first modulated symbol stream from the multiplexed signal that has been delayed. In the generating of the second bit likelihood stream, the multiplexed signal may be demapped, with the first modulated symbol stream being included in the multiplexed signal as an undefined signal component, to generate the second bit likelihood stream, when a signal-to-noise ratio of the multiplexed signal satisfies a predetermined requirement, and the multiplexed signal from which the first modulated symbol stream has been subtracted may be demapped to generate the second bit likelihood stream, when the signal-to-noise ratio of the multiplexed signal fails to satisfy the predetermined requirement.

This allows operations to be selectively switched, depending on the signal-to-noise ratio, between generating the second modulated symbol stream form the multiplexed signal from which the first modulated symbol stream remains unremoved and generating the second modulated symbol stream from the multiplexed signal from which the first modulated symbol stream has been removed. This thus enables the reception device, etc. employing this reception method to prevent extreme decrease, etc. in the transmission capacity.

Note that although the above description of the embodiments illustrates an example in which two data series are multiplexed and transmitted on the two layers to simplify the description, it is clear that the present disclosure is readily extendable to multiplexing and transmitting three or more data series, following the embodiments.

Also, FIG. 1, and FIG. 13 to FIG. 15 illustrate an example in which a radio-frequency signal is sent from an external antenna connected to the transmission device that does not include an antenna, but the transmission device may include an antenna such that a radio-frequency signal is sent from such antenna of the transmission device. Also, FIG. 2, FIG. 7, and FIG. 16 to FIG. 19 illustrate an example in which a radio-frequency signal is sent from an external antenna connected to the reception device that does not include an antenna, but the reception device may include an antenna such that a radio-frequency signal is sent from such antenna of the reception device.

Also, the antennas used to send/receive a radio-frequency signal may be an antenna unit that includes a plurality of antennas.

Although not illustrated in FIG. 1, and FIG. 13 to FIG. 15, the transmission device may include a frame configuration unit that arranges a superposed signal generated by the adder in accordance with a predetermined frame configuration to generate a frame, and outputs such frame into the RF unit.

Here, the configuration of a frame generated by the frame configuration unit may be uniform, or may be changed in accordance with a control signal sent from a controller not illustrated. The frame configuration unit arranges, in a frame, a superposed modulated symbol stream in which the first data series and the second data series are multiplexed, in accordance with a predetermined rule.

The frame generated by the frame configuration unit may include a pilot symbol, a control information symbol, a preamble, etc. in addition to a data symbol. Note that a pilot symbol, a control information symbol, and a preamble can each be referred to by another name.

For example, a pilot symbol may be a symbol that is generated by mapping a bit stream known to the reception device on the basis of PSK modulation such as BPSK and QPSK. A pilot symbol may also be a symbol that includes an amplitude and in-phase (or complex value) known to the reception device. A pilot symbol may also be a symbol, according to which the reception device can estimate the amplitude and in-phase (or complex value) sent by the transmission device.

Then, the reception device uses the pilot symbol to perform frequency synchronization, time synchronization, channel estimation, etc. on the received signal. Channel estimation is also referred to as the estimation of channel state information (CSI).

A control information symbol is a symbol used to transmit information that should be notified to the reception device as information required to demodulate a received signal and obtain a desired data series.

For example, the transmission device sends a control information symbol corresponding to control information. The control information may indicate the mapping (modulation) scheme and error control coding scheme used for each data series, the code rate and code length of the error control coding scheme, and the positions where the modulated symbols of each data series are arranged in a frame, etc. The reception device demodulates the control information symbol to obtain the control information. The reception device then demodulates a data symbol on the basis of the obtained control information to obtain the data series.

The control information may also include information used to control the operations of an application, such as settings information for an upper layer.

A preamble is a signal added at the top of a frame. For example, the reception device may receive a signal that includes a preamble to perform processes such as frame detection and frame synchronization on the basis of the preamble. A preamble may also include a pilot symbol and a control information symbol. A frame may also include not only a preamble but also a postamble, which is a signal added at the rear end of the frame.

The encoders use low density parity check (LDPC) coding, turbo coding, etc., for example, as the error control coding scheme. The encoders may also use another coding scheme.

The transmission devices illustrated in FIG. 1, and FIG. 13 to FIG. 15 include their respective interleavers, but may not include interleavers as described above. In such a case, the transmission device may input a bit stream generated by each encoder directly into each mapper or may perform a process different from interleaving on the bit stream before inputting it into each mapper. When the transmission device does not include any interleavers, the reception devices illustrated in FIG. 2, FIG. 7, and FIG. 16 to FIG. 19 may not include any deinterleavers.

The deinterleavers of the reception devices illustrated in FIG. 2, FIG. 7, and FIG. 16 to FIG. 19 perform permutation on the basis of a permutation rule that is a reverse rule of the permutation rule used by the transmission side, but may perform an operation different from such permutation. For example, each deinterleaver may input into the corresponding decoder a plurality of bit likelihoods of a bit likelihood stream generated by the corresponding demapper in the bit order required for decoding performed by the decoder.

In the above description, although superposition coding and the variation of superposition coding are applied to wireless transmission, but the present disclosure is not limited to the application to wireless transmission, and thus may be applied to wired transmission, optical transmission, etc. and also to storage into a recording medium. A frequency band used for transmission is not limited to a radio-frequency band, and thus may be a baseband.

"A plurality of" used in the present disclosure is synonymous with "two or more." Ordinal numbers such as first, second, and third may be removed from the expressions, replaced by other wording, or newly added as appropriate.

Note that the devices, methods, etc. according to the present disclosure are not limited to the respective embodiments, and thus allow for various modifications for implementation. For example, in the embodiments, the technology of the present disclosure is implemented as a communication device (transmission device or reception device), but the technology of the present disclosure is not limited to this, and thus may be implemented as software used to execute a communication method (transmission method or reception method) executed by such communication device.

Also, two or more structural components of the transmission device or the reception device may be integrated as a single structural component, and a single structural component may be divided into two or more structural components. Also, the transmission device and the reception device may form a single transmission/reception device. In such a case, a plurality of structural components of the same kind may be integrated into a single structural component. For example, a transmission antenna and a reception antenna may be formed by a single antenna.

Also, for example, a process performed by a specified structural component may be performed by another structural component. The order of performing processes may be changed, and a plurality of processes may be performed in parallel.

Note that a program for executing the above-described communication method may be previously stored in a read only memory (ROM) to be executed by a central processing unit (CPU).

Moreover, the program for executing the above communication method may be stored in a computer-readable recording medium. Such program stored in the recording medium may be recorded in a random access memory (RAM) in a computer so that the computer may execute the communication method according to the program.

Note that each of the structural components according to the embodiments, etc. may be implemented as a large-scale integration (LSI), which is typically an integrated circuit. The structural components may take the form of individual chips, or one or more or all of the structural components according to the embodiments may be encapsulated into a single chip. Although LSI is illustrated here as an example, such chips may be referred to as integrated circuits (ICs), system LSIs, super LSIs, or ultra LSIs, depending on their degree of integration.

The ICs are not limited to LSIs. Each of the structural components thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

Furthermore, when the progress in a semiconductor technology or another derivative technology results in a new IC technology that replaces LSI, such new technology may off course be employed to integrate the devices or some of their structural components according to the embodiments. For example, adaptation to biotechnology is possible.

The present disclosure is widely applicable to radio systems for transmitting different modulated signals (multiplexed signals) from different antennas. The present disclosure is also applicable to multiple-input multiple-output (MIMO) transmission in a wired communication system that includes a plurality of transmission points. Examples of such wired communication system include a power line communication (PLC) system, an optical communication system, and a digital subscriber line (DSL) system.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a wireless communication system and a broadcasting system, etc. The present disclosure is widely applicable to a system for multiplexing a plurality of data series by superposition coding.

The present disclosure is also applicable to a wired communication system, etc. such as a power line communication (PLC) system, an optical communication system, and a digital subscriber line (DSL) system. The present disclosure is further applicable to a storage system, etc. for recording data into a recording medium such as an optical disk and a magnetic disk.

What is claimed is:

1. A reception device comprising:
a receiver configured to receive, via a reception antenna, a multiplexed signal on which a first signal and a second signal are superposed at an amplitude ratio, the first signal having a first in-phase component and a first orthogonal component, the second signal having a second in-phase component and a second orthogonal component, the second signal having been subjected to quadrature phase shift keying modulation, the second signal having been converted to generate the multiplexed signal such that:
(i) a polarity of the second in-phase component is inverted if a polarity of the first in-phase component is positive; and
(ii) a polarity of the second orthogonal component is inverted if a polarity of the first orthogonal component is positive; and
a signal processing circuit configured to demap the multiplexed signal to generate a bit likelihood stream of the second signal.

2. A reception method comprising:
receiving a multiplexed signal on which a first signal and a second signal are superposed at an amplitude ratio, the first signal having a first in-phase component and a first orthogonal component, the second signal having a second in-phase component and a second orthogonal component, the second signal having been subjected to quadrature phase shift keying modulation, the second signal having been converted to generate the multiplexed signal such that:
(i) a polarity of the second in-phase component is inverted if a polarity of the first in-phase component is positive; and
(ii) a polarity of the second orthogonal component is inverted if a polarity of the first orthogonal component is positive; and
demapping the multiplexed signal to generate a bit likelihood stream of the second signal.

* * * * *